United States Patent
Suzuki et al.

(10) Patent No.: US 9,050,904 B2
(45) Date of Patent: Jun. 9, 2015

(54) SHIFT RANGE SWITCHER

(71) Applicant: DENSO CORPORATION, Kariya, Aichi-pref. (JP)

(72) Inventors: Fuminori Suzuki, Okazaki (JP); Jun Yamada, Nagoya (JP); Seiji Nakayama, Obu (JP)

(73) Assignee: DENSO CORPORATION, Kariya (JP)

( * ) Notice: Subject to any disclaimer, the term of this patent is extended or adjusted under 35 U.S.C. 154(b) by 83 days.

(21) Appl. No.: 13/705,665

(22) Filed: Dec. 5, 2012

(65) Prior Publication Data

US 2013/0144478 A1 Jun. 6, 2013

(30) Foreign Application Priority Data

Dec. 6, 2011 (JP) .................................. 2011-266683
Sep. 14, 2012 (JP) .................................. 2012-202507

(51) Int. Cl.
*B60L 15/20* (2006.01)

(52) U.S. Cl.
CPC ............. *B60L 15/20* (2013.01); *B60L 15/2054* (2013.01); *B60L 2240/425* (2013.01); *B60L 2240/486* (2013.01); *Y02T 10/642* (2013.01); *Y02T 10/7275* (2013.01)

(58) Field of Classification Search
CPC ... B60W 10/08; B60W 10/06; Y10S 903/946; Y02T 10/6239; G11B 5/59627
USPC ............. 701/22; 318/446, 591, 634; 73/118.1
See application file for complete search history.

(56) References Cited

U.S. PATENT DOCUMENTS

| | | | |
|---|---|---|---|
| 7,629,760 B2* | 12/2009 | Isobe et al. ..................... | 318/446 |
| 2003/0213296 A1* | 11/2003 | Kaigawa et al. ............. | 73/118.1 |
| 2008/0024081 A1 | 1/2008 | Isobe et al. | |
| 2008/0054835 A1* | 3/2008 | Tamaru .......................... | 318/634 |
| 2011/0175563 A1* | 7/2011 | Yamada et al. ............... | 318/591 |

* cited by examiner

*Primary Examiner* — Helal A Algahaim
*Assistant Examiner* — Michael Fouche
(74) *Attorney, Agent, or Firm* — Nixon & Vanderhye P.C.

(57) ABSTRACT

A shift range switcher includes a motor for switching a shift range and a controller for energizing the motor. The controller estimates temperatures of the motor and controller. The controller adds to the estimated controller temperature a value corresponding to heat generation in the controller due to energization of the motor. The controller subtracts from the estimated controller temperature a value corresponding to heat release from the controller due to de-energization of the motor. The controller adds to the estimated motor temperature a value corresponding to heat generation in the motor due to the energization. The controller subtracts from the estimated motor temperature a value corresponding to heat release from the motor due to the de-energization. The controller prohibits or restricts operations of the controller and the motor when at least one of the controller and motor estimated temperatures reaches an allowable temperature limit.

19 Claims, 13 Drawing Sheets

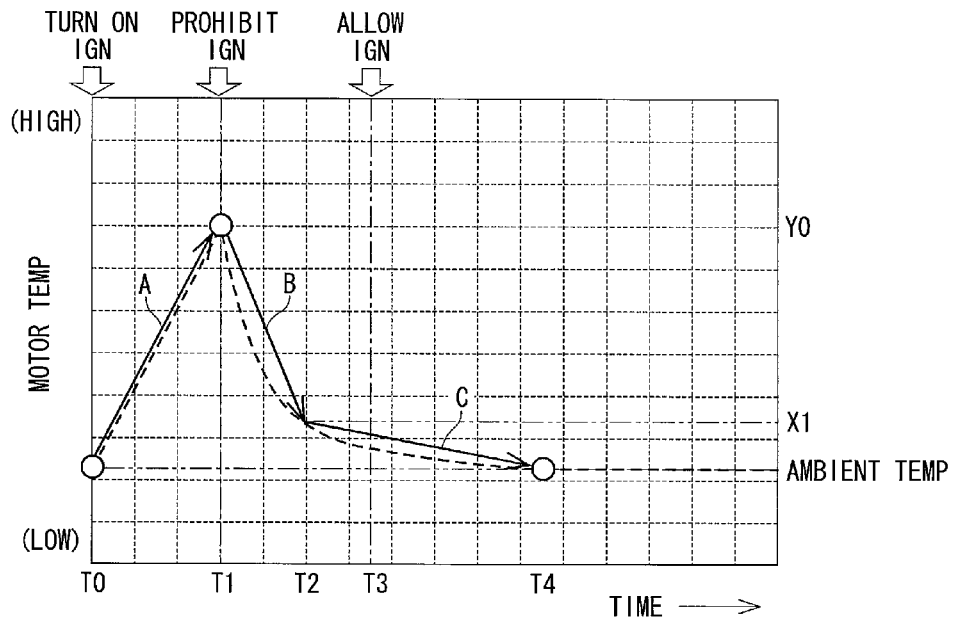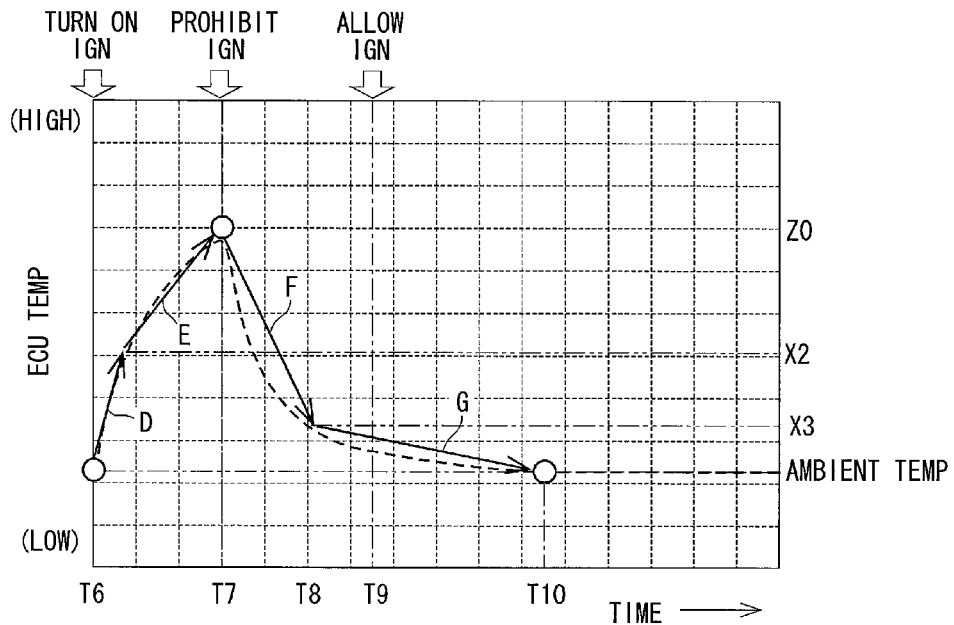

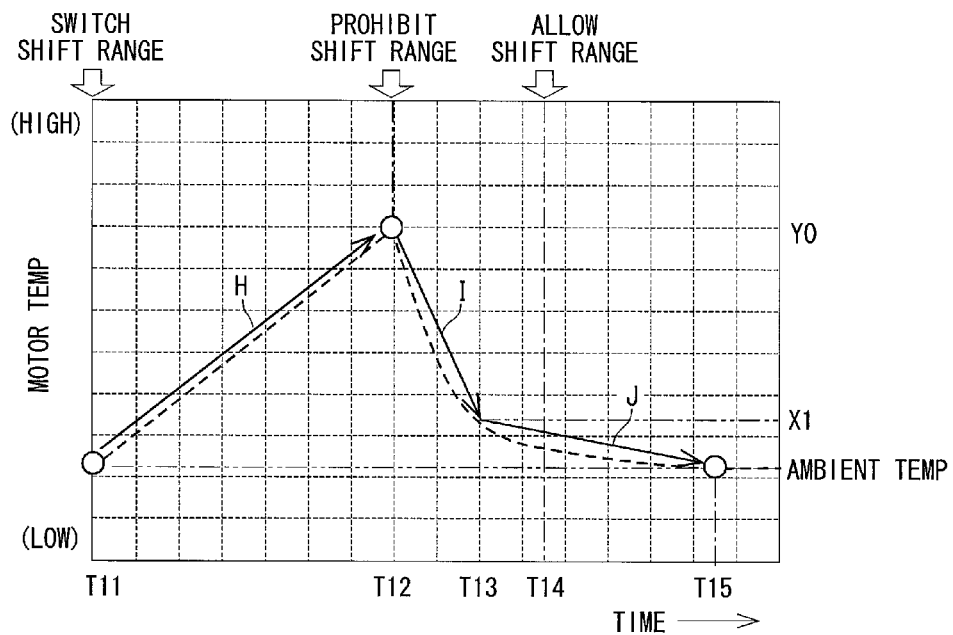
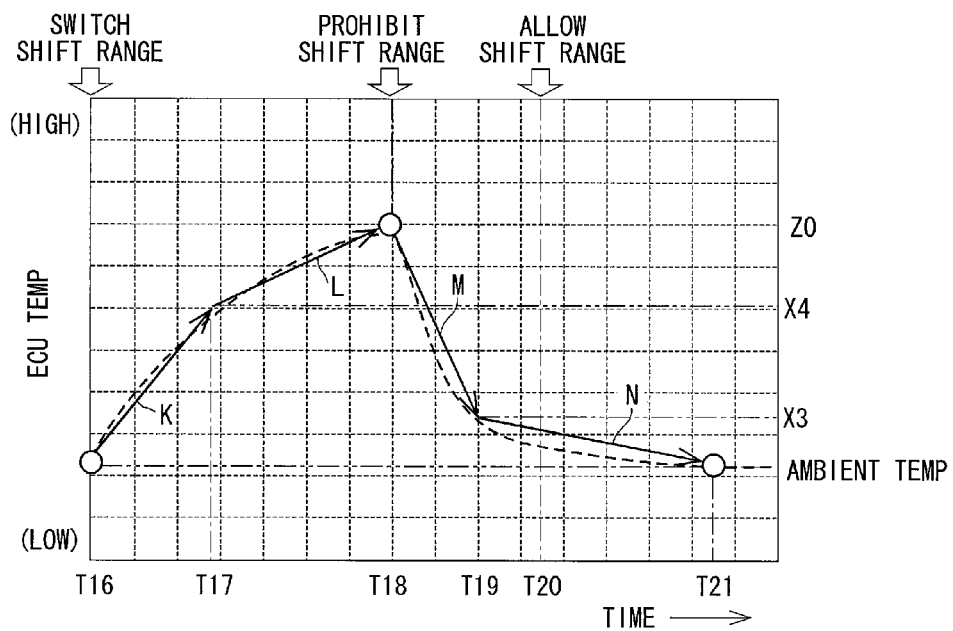

SHIFT RANGE SWITCHER

CROSS REFERENCE TO RELATED APPLICATION

This application is based on Japanese Patent Application No. 2011-266683 filed on Dec. 6, 2011 and No. 2012-202507 filed on Sep. 14, 2012, the contents of which are incorporated herein by reference.

TECHNICAL FIELD

The present disclosure relates to a shift range switcher for switching a shift range of a vehicle according to an operation of a driver of the vehicle.

BACKGROUND

In a conventional shift range switcher, a shift range switching operation performed by a driver to switch a shift range is detected by using a switch or the like, and a motor is driven in accordance with a detection signal of the switch so that the shift range can be switched.

When the driver turns ON an ignition switch, the shift range switcher performs an initial learning process for learning a relationship between a rotation position of the motor and an output signal of an encoder that detects the rotation position of the motor.

In a shift range switcher disclosed in US 2011/0175563 corresponding to JP-A-2011-151931, when the initial learning process is performed once, the initial learning process is prohibited for a predetermined period of time that allows the motor to be cooled to a predetermined temperature. Thus, even when the driver repeatedly turns ON and OFF the ignition switch, a significant increase in temperatures of the motor and an electronic controller for energizing the motor are prevented so that the motor and the electronic controller can be protected from heat damage.

In a shift range switcher disclosed in US 2008/0024081 corresponding to JP-A-2008-32176, when the driver performs the shift range switching operation at a short interval that cannot suitably cool the motor, the number of times the shift range switching operation is performed at the short interval is counted. Then, when the counted number reaches a predetermined number corresponding to allowable temperature limits of the motor and the electronic controller, the electronic controller is prohibited from energizing the motor for a predetermined period of time. Thus, a significant increase in temperatures of the motor and the electronic controller is prevented.

One disadvantage of the shift range switcher disclosed in US 2011/0175563 is that when the initial learning process is performed once, the initial learning process is always prohibited for the predetermined period of time.

One disadvantage of the shift range switcher disclosed in US 2008/0024081 is that the temperature of the motor is estimated based on only the number of times the shift range switching operation is performed. That is, the temperature of the motor is estimated without consideration of the fact that the motor is cooled at a little within the short time interval. Therefore, the electronic controller may be prohibited from energizing the motor unnecessarily. Further, another disadvantage of the shift range switcher disclosed in US 2008/0024081 is that when the counted number reaches the predetermined number, the electronic controller is always prohibited from energizing the motor.

SUMMARY

In view of the above, it is an object of the present disclosure to provide a shift range switcher configured to reduce unnecessary prohibition of operations of a motor for switching a shift range and an electronic controller for energizing the motor.

According to an aspect of the present disclosure, a shift range switcher includes a motor and an electric control unit (ECU). The motor switches a shift range of a vehicle. The ECU supplies electric current to the motor according to an operation of a driver of the vehicle. The ECU calculates an estimated temperature of the motor and an estimated temperature of the ECU. The ECU includes an ECU reference temperature setting section, an ECU temperature adder, an ECU temperature subtractor, a motor reference temperature setting section, a motor temperature adder, a motor temperature subtractor, and a heat controller. The ECU reference temperature setting section sets the estimated temperature of the ECU to an ambient temperature when the ECU starts to calculate the estimated temperature of the ECU. The ECU temperature adder adds a first temperature value to the estimated temperature of the ECU. The first temperature value corresponds to the amount of heat generated in the ECU when the motor is energized. The ECU temperature subtractor subtracts a second temperature value from the estimated temperature of the ECU. The second temperature value corresponds to the amount of heat released from the ECU when the motor is de-energized. The motor reference temperature setting section sets the estimated temperature of the motor to the ambient temperature when the ECU starts to calculate the estimated temperature of the motor. The motor temperature adder adds a third temperature value to the estimated temperature of the motor. The third temperature value corresponds to the amount of heat generated in the motor when the motor is energized. The motor temperature subtractor subtracts a fourth temperature value from the estimated temperature of the motor. The fourth temperature value corresponds to the amount of heat released from the motor when the motor is de-energized. The heat controller prohibits or restricts operations of the ECU and the motor when the estimated temperature of the ECU reaches an allowable temperature limit of the ECU or when the estimated temperature of the motor reaches an allowable temperature limit of the motor.

BRIEF DESCRIPTION OF THE DRAWINGS

The above and other objects, features, and advantages will become more apparent from the following description and drawings in which like reference numerals depict like elements. In the drawings:

FIG. 3 is a diagram illustrating a behavior of a temperature of a motor of the shift range switcher of FIG. 1 when an ignition switch of a vehicle is turned ON and OFF;

FIG. 4 is a diagram illustrating a behavior of a temperature of an ECU of the shift range switcher of FIG. 1 when the ignition switch is turned ON and OFF;

FIG. 5 is a diagram illustrating the behavior of the temperature of the motor when a shift range of the vehicle is switched;

FIG. 6 is a diagram illustrating the behavior of the temperature of the ECU when the shift range is switched;

DETAILED DESCRIPTION

First Embodiment

Figure 1:
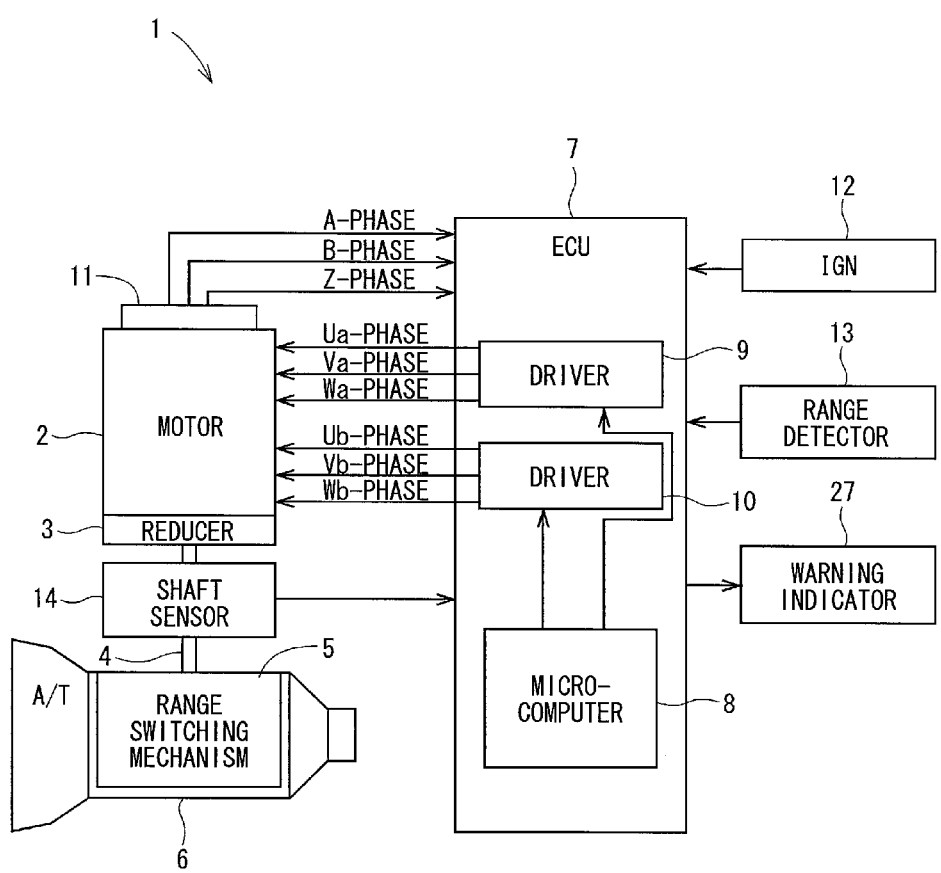
FIG. 1 is a block diagram of a shift range switcher according to a first embodiment of the present disclosure.

A shift range switcher 1 according to a first embodiment of the present disclosure is shown in FIGS. 1, 2, 3, 4, 5, 6, 7, 8, 9, 10, 11, 12A, and 12B.

Firstly, a structure of the shift range switcher 1 is described with reference to FIGS. 1 and 2.

The shift range switcher 1 has a motor 2. For example, the motor 2 can be a switched reluctance motor (SRM) with a reducer 3. Based on a rotation angle of an output shaft 4 connected to the reducer 3, a range switching mechanism 5 of the shift range switcher 1 switches a shift range of an automatic transmission (AT) 6 between a parking (P) range, a reverse (R) range, a neutral (N) range, and a drive (D) range.

An electric control unit (ECU) 7 generates and supplies three-phase alternating current to the motor 2 by controlling motor drivers 9 and 10 based on a command signal from a microcomputer 8. A stator (not shown) of the motor 2 has two three-phase coils. The motor driver 9 supplies the current to one three-phase coil (Ua-phase, Va-phase, Wa-phase), and the motor driver 10 supplies the current to the other three-phase coil (Ub-phase, Vb-phase, Wb-phase). Thus, even if one of the motor drivers 9 and 10 fails or is broken, the other of the motor drivers 9 and 10 can drive the motor 2.

An encoder 11 is attached to the motor 2 and detects a rotation angle of a rotor of the motor 2. For example, the encoder 11 can be a magnetic rotary encoder and output a pulse signal of A-phase, B-phase, or Z-phase to the ECU 7 in synchronization with rotation of the rotor. The microcomputer 8 of the ECU 7 counts the number of rising and falling edges of the A-phase signal and the B-phase signal. The microcomputer 8 rotates the motor 2 by switching the phase of the three-phase coil of the motor 2 energized by the motor drivers 9 and 10 in a predetermined order. The Z-phase signal of the encoder 11 is used for detection of a reference rotation angle of the rotor.

When a driver turns ON an ignition switch (IGN) 12 of a vehicle, the ECU 7 is powered. Then, the microcomputer 8 of the ECU 7 performs an initial learning process for initializing the motor 2 by matching a count value of the encoder 11 with a real rotation position of the rotor of the motor 2. Specifically, in the initial learning process, the motor 2 rotates in forward and reverse directions to synchronize the rotation position of the rotor with the energization phase.

When the driver operates a shift lever after the ignition switch 12 is turned ON, a shift range detector 13 detects a position of the shift lever. The shift range detector 13 outputs a shift range signal, indicative of a target shift range corresponding to the position of the shift lever, to the microcomputer 8 of the ECU 7. In response to the shift range signal, the microcomputer 8 sets a target rotation angle of the rotor corresponding to the target shift range and energizes the motor 2 so that the counter value of the encoder 11 can be a target count value corresponding to the target rotation angle. The microcomputer 8 feedback controls the motor 2 in such a manner that the motor 2 can stop at a position where the counter value of the encoder 11 is equal to the target count value.

An output shaft sensor 14 is attached to the output shaft 4 of the motor 2 and detects a rotation angle of the output shaft 4. For example, the output shaft sensor 14 can be a potentiometer. The present shift range of the automatic transmission 6 can be determined based on the rotation angle of the motor 2 detected by the output shaft sensor 14.

Figure 2:
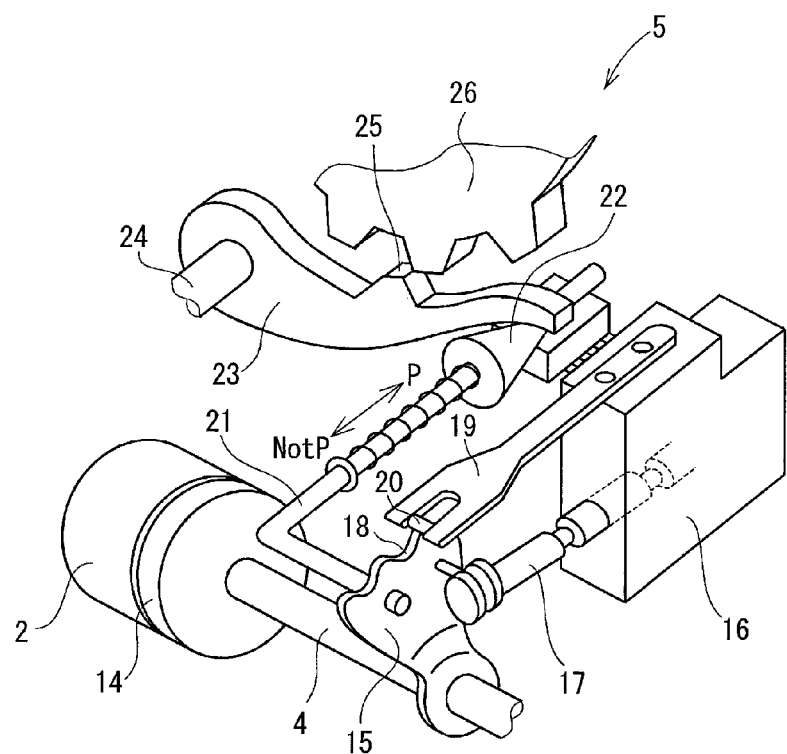
FIG. 2 is a diagram illustrating a perspective view of a range switching mechanism of the shift range switcher of FIG. 1.

As shown in FIG. 2, a detent lever 15 is fixed to the outputs shaft 4. For example, the detent lever 15 can have a shape like a fan or a sector. A spool valve 17 of a manual valve 16 is connected to the detent lever 15. When the motor 2 rotates the detent lever 15, a position of the spool valve 17 changes. According to the position of the spool valve 17, the shift range of the automatic transmission 6 switches to any one of the P range, the R range, the N range, and the D range. A shift range except the P range is hereinafter sometimes referred to as the "not-P range". That is, the R range, the N range, and the D range are hereinafter sometimes collectively referred to as the "not-P range".

The detent lever 15 has multiple recesses 18 corresponding to the respective shift ranges. When an engaging portion 20 of a detect spring 19 fits in the recess 18, the detent lever 15 is held at a position corresponding to the shift range. Thus, the spool valve 17 of the manual valve 16 is held at a position corresponding to the target shift range. The engaging portion 20 is located at an end of the detect spring 19.

A L-shaped parking rod 21 is coupled to the detent lever 15. A conical member 22 is attached to an end of the parking rod 21 and in contact with a lock lever 23. The lock lever 23 has a rotation shaft 24 and can move up and down with respect to the rotation shaft 24.

When the motor 2 rotates the detect lever 15, the conical member 22 attached to the end of the parking rod 21 moves toward the rotation shaft 24 so that the lock lever 23 can move up and down with respect to the rotation shaft 24.

When the shift range is in the P range, the parking road 21 moves in a direction toward the lock lever 23 so that a large diameter portion of the conical member 22 can push up the lock lever 23. Thus, a projection 25 of the lock lever 23 engages with the parking gear 26 so that the parking gear 26 can be locked. As a result, drive wheels of the vehicle stop rotating, and the vehicle is kept in a parking condition where the vehicle is prevented from running.

In contrast, when the shift range is in the not-P range, the parking road 21 moves in a direction away from the lock lever 23 so that the large diameter portion of the conical member 22 can separate from the lock lever 23. Thus, the projection 25 of the lock lever 23 disengages from the parking gear 26 so that the parking gear 26 can be unlocked. As a result, the vehicle is kept in a run condition where the vehicle is allowed to run.

Next, heat generation controls of the motor 2 and the ECU 7 are described.

FIG. 3 shows a behavior of a temperature of the motor 2 when the driver performs a continuous ON and OFF operation of the ignition switch 12, and FIG. 4 shows a behavior of a temperature of the ECU 7 when the driver performs the continuous ON and OFF operation of the ignition switch 12.

FIG. 5 shows the behavior of the temperature of the motor 2 when the driver continuously moves the shift lever from the P range to the not-P range and back to the P range. FIG. 6 shows the behavior of the temperature of the ECU 7 when the driver continuously moves the shift lever from the P range to the not-P range and back to the P range.

In FIGS. 3, 4, 5, and 6, broken lines represent the behaviors of the temperatures of the motor 2 and the ECU 7 observed in experiments, and solid arrows represent the behaviors of the temperatures of the motor 2 and the ECU 7 estimated by the microcomputer 8 of the ECU 7. It is noted that the behaviors of the temperatures of the motor 2 and the ECU 7 shown in FIGS. 3, 4, 5, and 6 are based on the premise that a voltage of 15 volts as a maximum voltage of the vehicle is supplied to the motor 2 from the ECU 7.

When the microcomputer 8 of the ECU 7 calculates the estimated temperature of the ECU 7, the ECU 7 can serve as an ECU reference temperature setting section, an ECU temperature adding section, and an ECU temperature subtracting section in claims.

When the microcomputer 8 of the ECU 7 calculates the estimated temperature of the motor 2, the ECU 7 can serve as a motor reference temperature setting section, a motor temperature adding section, and a motor temperature subtracting section in claims. Further, when the microcomputer 8 of the ECU 7 prohibits the operations of the motor 2 and the ECU 7, the ECU 7 can serve as a heat generation controlling section.

Firstly, the behavior of the temperature of the motor 2 when the driver performs the continuous ON and OFF operation of the ignition switch 12 is described below with reference to FIG. 3.

As shown in FIG. 3, at a time T0, the real temperature of the motor 2 is almost equal to an ambient temperature. It is noted that the ambient temperature corresponds to the maximum usage temperature of the vehicle. After the driver starts the continuous ON and OFF operation of the ignition switch 12 at the time T0, the real temperature of the motor 2 increases linearly.

When the microcomputer 8 determines, at a time T1, that the temperature of motor 2 reaches a predetermined motor allowable temperature limit Y0, the microcomputer 8 serves as a heat generation controlling section 87 for prohibiting the operations of the ECU 7 and the motor 2 by interrupting the energization to the motor 2 from the motor drivers 9 and 10. As a result, the real temperature of the motor 2 decreases in a quadratic manner from the time T1 through a time T4 and becomes almost equal to the ambient temperature at the time T4.

The ambient temperature is preset in the microcomputer 8. The microcomputer 8 serves as a motor reference temperature setting section 84 for setting the temperature of the motor 2 estimated at the time T0 as the ambient temperature. Whenever the driver performs the ON operation of the ignition switch 12, the microcomputer 8 serves as a motor temperature adding section 85 for adding a first unit temperature increase to the estimated temperature of the motor 2. The first unit temperature increase represents an increase in the temperature of the motor 2 observed in the experiments when the ignition switch 12 is turned ON once. Thus, the microcomputer 8 estimates the temperature of the motor 2 as indicated by a solid arrow A in FIG. 3.

When the energization to the motor 2 is stopped, the microcomputer 8 serves as a motor temperature subtracting section 86 for subtracting a first unit temperature decrease from the estimated temperature of the motor 2 each time a first unit time elapses until the energization to the motor 2 is started. The first unit temperature decrease represents a decrease in the temperature of the motor 2 per the first unit time observed in the experiments when the energization to the motor 2 is stopped. For example, the first unit time can be one second. As mentioned above, the examination result, indicated by the broken line in FIG. 3, shows that the real temperature of the motor 2 decreases in a quadratic manner. Based on the examination result, the microcomputer 8 changes the first unit temperature decrease between when the estimated temperature of the motor 2 is higher than a threshold temperature X1° C. and when the estimated temperature of the motor 2 is lower than the threshold temperature X1° C. Thus, the microcomputer 8 estimates the temperature of the motor 2 as indicated by solid arrows B and C in FIG. 3.

Next, the behavior of the temperature of the ECU 7 when the driver performs the continuous ON and OFF operation of the ignition switch 12 is described below with reference to FIG. 4.

As shown in FIG. 4, at a time T6, the real temperature of the ECU 7 is almost equal to the ambient temperature. After the driver starts the continuous ON and OFF operation of the ignition switch 12 at the time T6, the real temperature of the ECU 7 increases in a quadratic manner.

When the microcomputer 8 determines, at a time T7, that the temperature of ECU 7 reaches a predetermined ECU allowable temperature limit Z0, the microcomputer 8 serves as the heat generation controlling section 87 for prohibiting the operations of the ECU 7 and the motor 2 by interrupting the energization to the motor 2 from the motor drivers 9 and 10. As a result, the real temperature of the ECU 7 decreases in a quadratic manner from the time T7 through a time T10 and becomes almost equal to the ambient temperature at the time T10.

The microcomputer 8 serves as an ECU reference temperature setting section 81 for setting the temperature of the ECU 7 estimated at the time T6 as the ambient temperature. Whenever the driver performs the ON operation of the ignition switch 12, the microcomputer 8 serves as an ECU temperature adding section 82 for adding a second unit temperature increase to the estimated temperature of the ECU 7. The second unit temperature increase represents an increase in the temperature of the ECU 7 observed in the experiments when the ignition switch 12 is turned ON once. As mentioned above, the examination result, indicated by the broken line in FIG. 4, shows that the real temperature of the ECU 7 increases in a quadratic manner. Based on the examination result, the microcomputer 8 changes the second unit temperature increase between when the estimated temperature of the ECU 7 is lower than a threshold temperature X2° C. and when the estimated temperature of the ECU 7 is higher than the threshold temperature X2° C. Thus, the microcomputer 8 estimates the temperature of the ECU 7 as indicated by solid arrows D and E in FIG. 4.

When the energization to the motor 2 is stopped, the microcomputer 8 serves as an ECU temperature subtracting section 83 for subtracting a second unit temperature decrease from the estimated temperature of the ECU 7 each time a second unit time elapses until the energization to the motor 2 is started. The second unit temperature decrease represents a decrease in the temperature of the ECU 7 per the second unit time observed in the experiments when the energization to the ECU 7 is stopped. For example, the second unit time can be one second. As mentioned above, the examination result, indicated by the broken line in FIG. 4, shows that the real temperature of the ECU 7 decreases in a quadratic manner. Based on the examination result, the microcomputer 8 changes the second unit temperature decrease between when the estimated temperature of the ECU 7 is higher than a threshold temperature X3° C. and when the estimated temperature of the ECU 7 is lower than the threshold temperature X3° C. Thus, the microcomputer 8 estimates the temperature of the ECU 7 as indicated by solid arrows F and G in FIG. 4.

Next, the behavior of the temperature of the motor 2 when the driver performs the continuous operation of the shift lever (i.e., continuous switching operation of the shift range) is described below with reference to FIG. 5.

As shown in FIG. 5, at a time T11, the real temperature of the motor 2 is almost equal to the ambient temperature. After the driver starts the continuous switching operation of the shift range at the time T11, the real temperature of the motor 2 increases linearly. As can be seen from FIGS. 3 and 5, a rate at which the real temperature of the motor 2 increases when the driver starts the continuous switching operation of the shift range is slower than a rate at which the real temperature of the motor 2 increases when the driver starts the continuous ON and OFF operation of the ignition switch 12.

When the microcomputer 8 determines, at a time T12 that the temperature of motor 2 reaches the motor allowable temperature limit Y0, the microcomputer 8 serves as the heat generation controlling section 87 for prohibiting the operations of the ECU 7 and the motor 2. As a result, the real temperature of the motor 2 decreases in a quadratic manner from the time T12 through a time T15.

The microcomputer 8 serves as the motor reference temperature setting section 84 for setting the temperature of the motor 2 estimated at the time T11 as the ambient temperature. Whenever the driver performs the switching operation of the shift range, the microcomputer 8 serves as the motor temperature adding section 85 for adding a third unit temperature increase to the estimated temperature of the motor 2. The third unit temperature increase represents an increase in the temperature of the motor 2 observed in the experiments when the shift range is switched once. Thus, the microcomputer 8 estimates the temperature of the motor 2 as indicated by a solid arrow H in FIG. 5.

When the energization to the motor 2 is stopped, the microcomputer 8 serves as the motor temperature subtracting section 86 for subtracting a third unit temperature decrease from the estimated temperature of the motor 2 each time a third unit time elapses until the energization to the motor 2 is started. The third unit temperature decrease represents a decrease in the temperature of the motor 2 per the third unit time observed in the experiments when the energization to the motor 2 is stopped. For example, the third unit time can be one second. As mentioned above, the examination result, indicated by the broken line in FIG. 5, shows that the real temperature of the motor 2 decreases in a quadratic manner. Based on the examination result, the microcomputer 8 changes the third unit temperature decrease between when the estimated temperature of the motor 2 is higher than the threshold temperature X1° C. and when the estimated temperature of the motor 2 is lower than the threshold temperature X1° C. Thus, the microcomputer 8 estimates the temperature of the motor 2 as indicated by solid arrows I and J in FIG. 3.

Next, the behavior of the temperature of the ECU 7 when the driver performs the continuous operation of the shift lever (i.e., continuous switching operation of the shift range) is described below with reference to FIG. 6.

As shown in FIG. 6, at a time T16, the real temperature of the ECU 7 is almost equal to the ambient temperature. After the driver starts the continuous switching operation of the shift range at the time T16, the real temperature of the ECU 7 increases in a quadratic manner. As can be seen from FIGS. 3 and 5, a rate at which the real temperature of the ECU 7 increases when the driver starts the continuous switching operation of the shift range is slower than a rate at which the real temperature of the ECU 7 increases when the driver starts the continuous ON and OFF operation of the ignition switch 12.

When the microcomputer 8 determines, at a time T18, that the temperature of ECU 7 reaches the ECU allowable temperature limit Z0, the microcomputer 8 serves as the heat generation controlling section 87 for prohibiting the operations of the ECU 7 and the motor 2. As a result, the real temperature of the ECU 7 decreases in a quadratic manner from the time T18 through a time T21.

The microcomputer 8 serves as the ECU reference temperature setting section 81 for setting the temperature of the ECU 7 estimated at the time T16 as the ambient temperature. Whenever the driver performs the switching operation of the shift range, the microcomputer 8 serves as the ECU temperature adding section 82 for adding a fourth unit temperature increase to the estimated temperature of the ECU 7. The fourth unit temperature increase represents an increase in the temperature of the ECU 7 observed in the experiments when the switching operation of the shift range is performed once. As mentioned above, the examination result, indicated by the broken line in FIG. 6, shows that the real temperature of the ECU 7 increases in a quadratic manner. Based on the examination result, the microcomputer 8 changes the fourth unit temperature increase between when the estimated temperature of the ECU 7 is lower than a threshold temperature X4° C. and when the estimated temperature of the ECU 7 is higher than the threshold temperature X4° C. Thus, the microcomputer 8 estimates the temperature of the ECU 7 as indicated by solid arrows K and L in FIG. 6.

When the energization to the motor 2 is stopped, the microcomputer 8 serves as the ECU temperature subtracting section 83 for subtracting a fourth unit temperature decrease from the estimated temperature of the ECU 7 each time a fourth unit time elapses until the energization to the motor 2 is started. The fourth unit temperature decrease represents a decrease in the temperature of the ECU 7 per the fourth unit time observed in the experiments when the energization to the motor 2 is stopped. For example, the fourth unit time can be one second. As mentioned above, the examination result, indicated by the broken line in FIG. 6, shows that the real temperature of the ECU 7 decreases in a quadratic manner. Based on the examination result, the microcomputer 8 changes the fourth unit temperature decrease between when the estimated temperature of the ECU 7 is higher than the threshold temperature X3° C. and when the estimated temperature of the ECU 7 is lower than the threshold temperature X3° C. Thus, the microcomputer 8 estimates the temperature of the ECU 7 as indicated by solid arrows M and N in FIG. 6.

Figure 7:
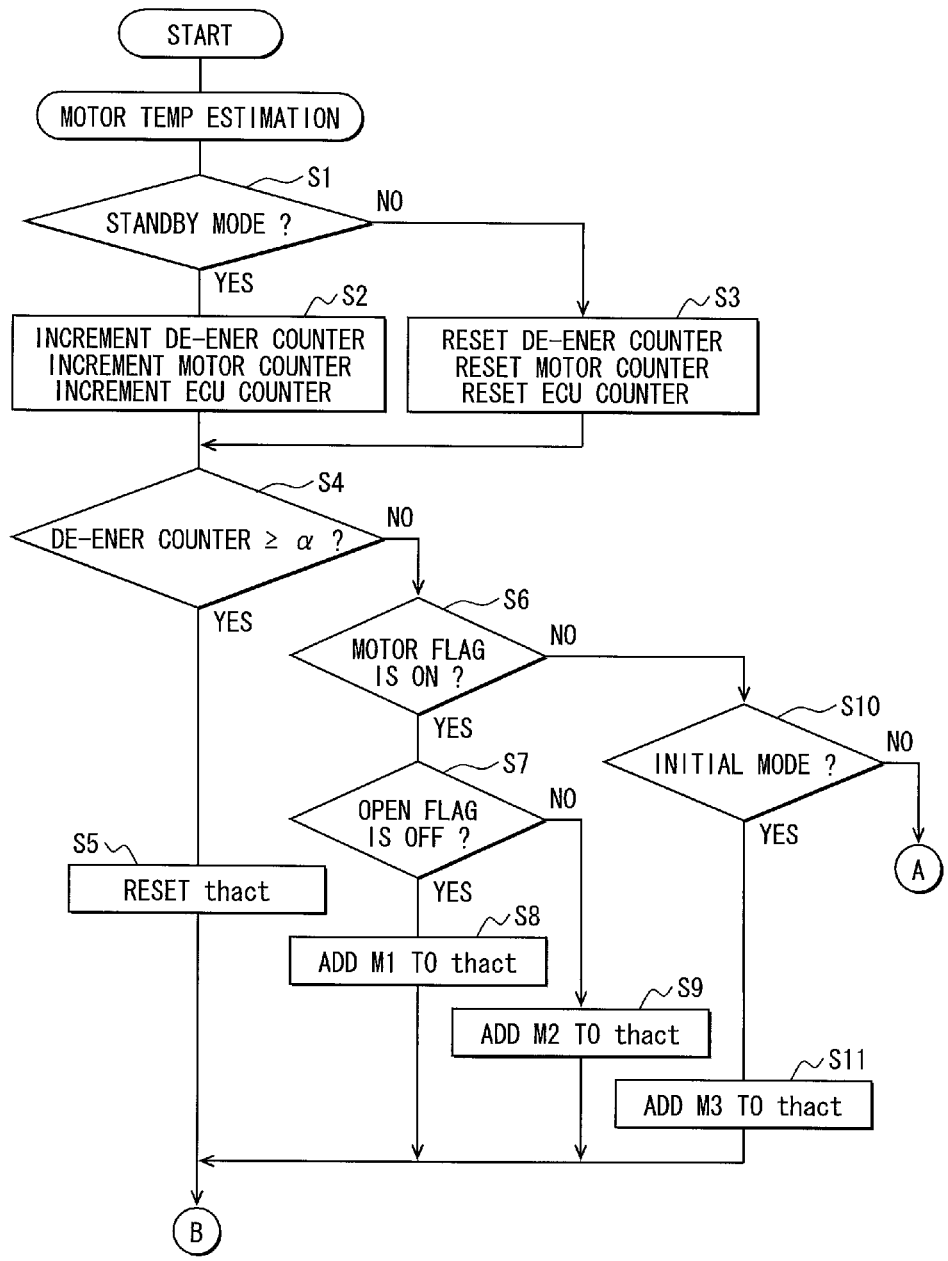
FIG. 7 is diagram illustrating a flow chart of a motor temperature estimation process performed by the ECU to estimate the temperature of the motor.
Figure 8:
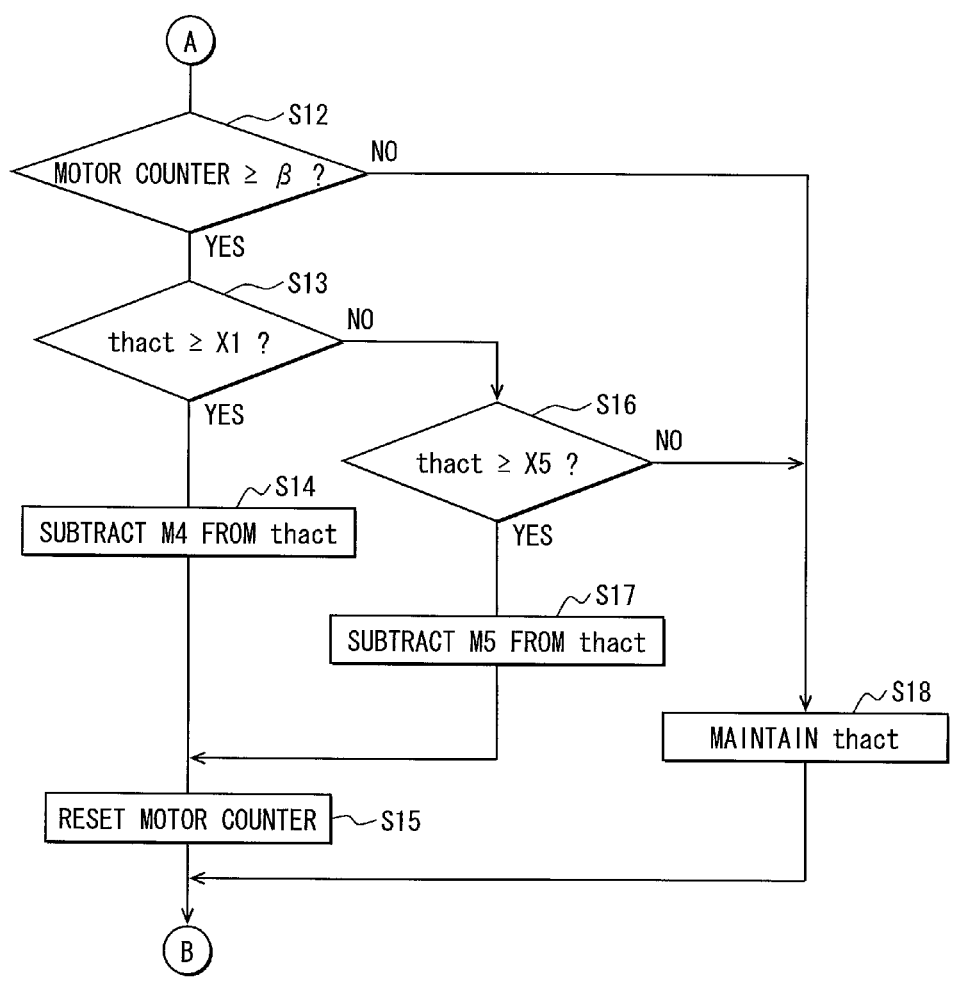
FIG. 8 is diagram illustrating a flow chart of the motor temperature estimation process performed by the ECU to estimate the temperature of the motor.
Figure 9:
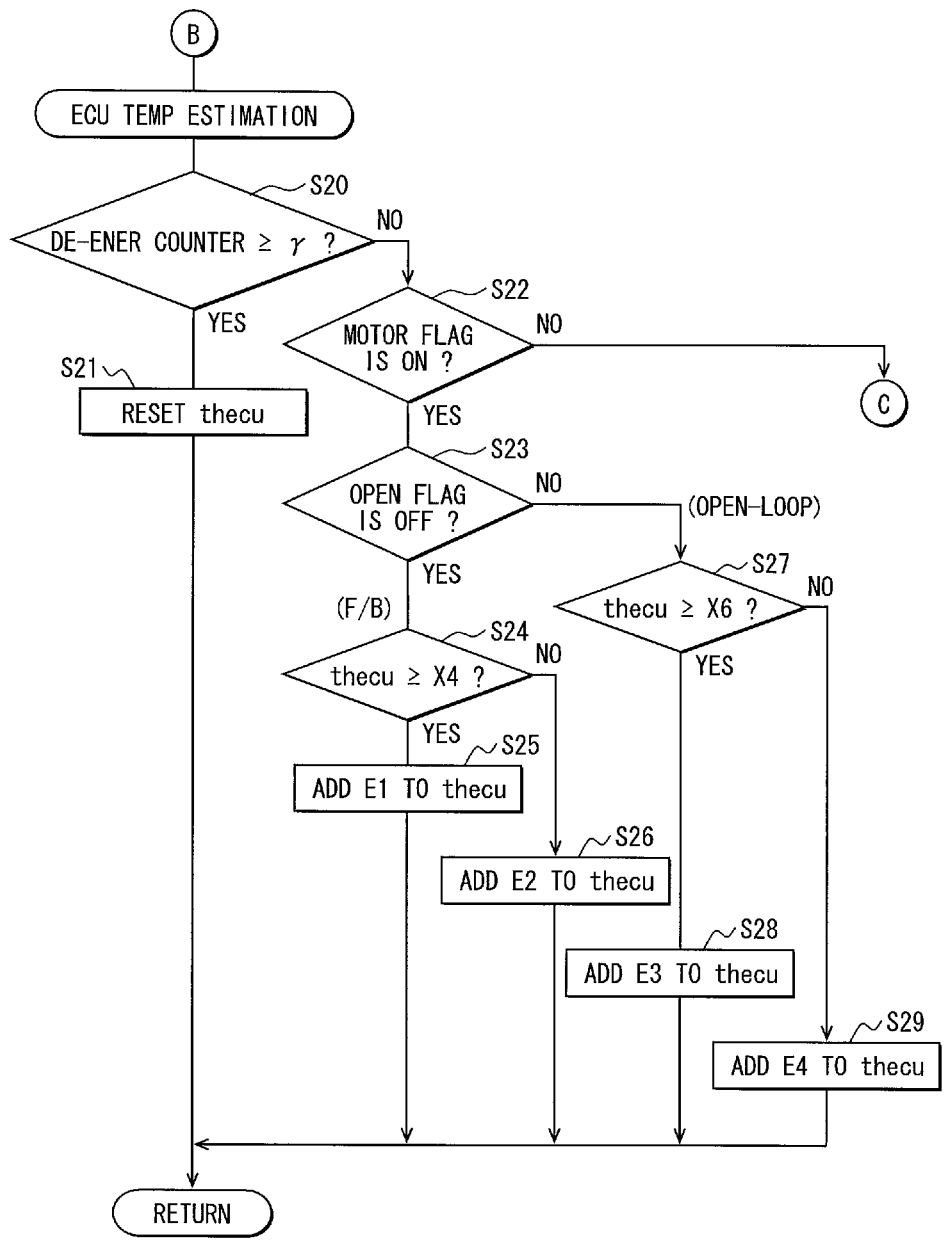
FIG. 9 is diagram illustrating a flow chart of an ECU temperature estimation process performed by the ECU to estimate the temperature of the ECU.
Figure 10:
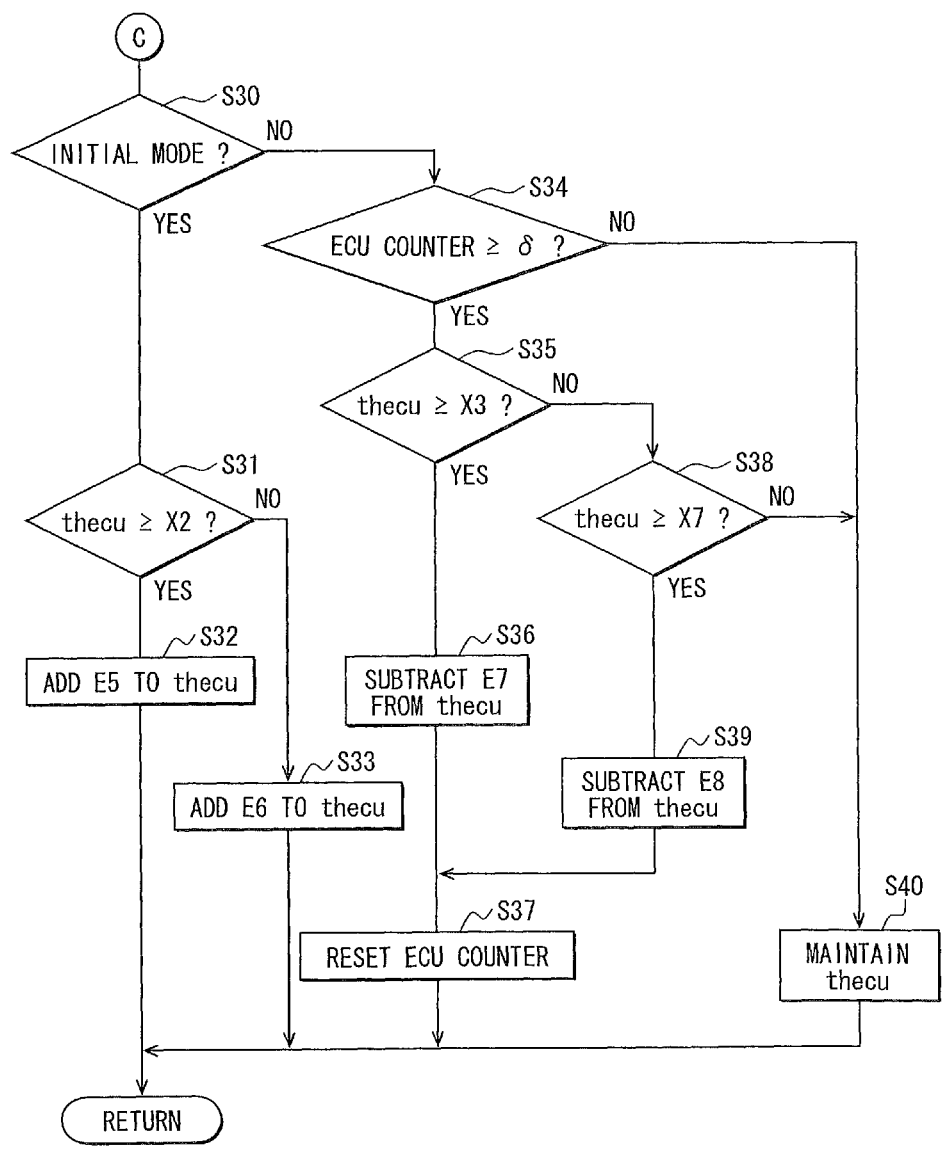
FIG. 10 is diagram illustrating a flow chart of the ECU temperature estimation process performed by the ECU to estimate the temperature of the ECU.

FIGS. 7 and 8 show a motor temperature estimation process performed by the microcomputer 8 of the ECU 7 to estimate the temperature of the motor 2. FIGS. 9 and 10 show an ECU temperature estimation process performed by the microcomputer 8 of the ECU 7 to estimate the temperature of the ECU 7.

The microcomputer 8 performs the motor temperature estimation process at the same time as the ignition switch 12 is turned ON. The motor temperature estimation process starts at S1, where the microcomputer 8 determines whether the motor 2 is de-energized. When the motor 2 is de-energized, the motor 2 is in a standby mode. That is, at S1, the microcomputer 8 determines whether the motor 2 is in the standby mode.

If the motor 2 is de-energized corresponding to YES at S1, the motor temperature estimation process proceeds to S2, where the microcomputer 8 increments each of a de-energization counter, a motor standby counter, and an ECU standby counter.

In contrast, if the motor 2 is energized corresponding to NO at S1, the motor temperature estimation process proceeds to S3, where the microcomputer 8 resets each of the de-energization counter, the motor standby counter, and the ECU standby counter.

After S2 and S3, the motor temperature estimation process proceeds to S4, where the microcomputer 8 determines whether the motor 2 remains de-energized for a predetermined time α or more. Specifically, at S4, the microcomputer 8 determines whether a value of the de-energization counter is equal to or greater than the predetermined time α. If the motor 2 remains de-energized for the predetermined time α or more corresponding to YES at S4, the motor temperature estimation process proceeds to S5, where the microcomputer 8 resets an estimated temperature thact of the motor 2 to zero. It is noted that resetting the motor estimated temperature thact to zero means setting the motor estimated temperature thact to the ambient temperature that is preset in the microcomputer 8.

In contrast, if the motor 2 remains de-energized for a time period less than the predetermined time α corresponding to NO at S4, the motor temperature estimation process proceeds to S6.

At S6, the microcomputer 8 determines whether the driver performs the switching operation of the shift range by operating the shift lever. It is noted that when the driver performs the switching operation of the shift range, a motor flag is turned ON from OFF. That is, at S6, the microcomputer 8 determines whether the motor flag is ON. If the switching operation of the shift range is performed corresponding to YES at S6, the motor temperature estimation process proceeds to S7.

At S7, the microcomputer 8 determines whether the motor 2 needs to be feedback controlled. It is noted that when the motor 2 needs to be feedback controlled, an open flag is OFF. That is, at S7, the microcomputer 8 determines whether the open flag is OFF. It is noted that when the encoder 11 of the motor 2 fails or is broken, the open flag is turned ON so that the motor 2 can be open-loop controlled. If the motor 2 needs to be feedback controlled corresponding to YES at S7, the motor temperature estimation process proceeds to S8, where the microcomputer 8 adds a value M1° C. to the motor estimated temperature thact (i.e., thact+=M1).

The value M1° C. is the third unit temperature increase indicated by the solid arrow H in FIG. 5.

In contrast, if the motor 2 needs to be open-loop controlled corresponding to NO at S7, the motor temperature estimation process proceeds to S9, where the microcomputer 8 adds a value M2° C. to the motor estimated temperature thact (i.e., thact+=M2). It is noted that the value M2 is less than the value M1 (i.e., M1>M2).

In contrast, if the switching operation of the shift range is not performed corresponding to NO at S7, the motor temperature estimation process proceeds to S10.

At S10, the microcomputer 8 determines whether the driver turns ON the ignition switch 12 so that the initial learning process for initializing the motor 2 can be started. When the initial learning process is started, the motor 2 switches to an initialization mode. That is, at S10, the microcomputer 8 determines whether the motor 2 is in the initialization mode. If the initial learning process is started corresponding to YES at S10, the motor temperature estimation process proceeds to S11, where the microcomputer 8 adds a value M3° C. to the motor estimated temperature thact (i.e., thact+=M3).

In contrast, if the initial learning process is not started corresponding to NO at S10, the motor temperature estimation process proceeds to S12 shown in FIG. 8.

At S12, the microcomputer 8 determines whether the motor 2 remains de-energized for a predetermined time 13 (e.g., one second) or more. Specifically, at S12, the microcomputer 8 determines whether the value of the motor standby counter is equal to or greater than the predetermined time β. If the motor 2 remains de-energized for the predetermined time β or more corresponding to YES at S12, the motor temperature estimation process proceeds to S13.

At S13, the microcomputer 8 determines whether the motor estimated temperature thact is equal to or greater than the threshold temperature X1° C., i.e., determines whether thact≥X1. As shown in FIGS. 3 and 5, each of the first unit temperature decrease and the third unit temperature decrease of the motor 2 changes at the threshold temperature X1. If the motor estimated temperature thact is equal to or greater than the threshold temperature X1° C. corresponding to YES at S13, the motor temperature estimation process proceeds to S14, where the microcomputer 8 subtracts a value M4° C. from the motor estimated temperature thact (i.e., thact−=M4). After S14, the motor temperature estimation process proceeds to S15, where the microcomputer 8 resets the motor standby counter.

In contrast, if the motor estimated temperature thact is less than the threshold temperature X1° C. corresponding to NO at S13, the motor temperature estimation process proceeds to S16. At S16, the microcomputer 8 determines whether the motor estimated temperature thact is equal to or greater than a predetermined temperature X5° C., i.e., determines whether thact≥X5. It is noted that the temperature X5 is slightly (e.g., 10° C.) higher than the ambient temperature. The temperature X5 is set, based on the motor temperature characteristics that decreases in a quadratic manner as shown in FIGS. 3 and 5, so that the temperature of the motor 2 can decrease at a very slow rate.

If the motor estimated temperature thact is equal to or greater than the predetermined temperature X5° C. corresponding to YES at S16, the motor temperature estimation process proceeds to S17, where the microcomputer 8 subtracts a value M5° C. from the motor estimated temperature thact (i.e., thact−=M5). After S17, the motor temperature estimation process proceeds to S15, where the microcomputer 8 resets the motor standby counter.

In contrast, if the motor estimated temperature thact is less than the predetermined temperature X5° C. corresponding to NO at S16, the motor temperature estimation process proceeds to S18, where the microcomputer 8 maintains the motor estimated temperature thact unchanged. Thus, when the motor estimated temperature thact is equal to or slightly (e.g., 10° C.) greater than the ambient temperature, the motor estimated temperature thact is not subject to subtraction.

After S15, the microcomputer 8 ends the motor temperature estimation process and starts the ECU temperature estimation process shown in FIGS. 9 and 10.

As shown in FIG. 9, the ECU temperature estimation process starts at S20, where the microcomputer 8 determines whether the motor 2 remains de-energized for a predetermined time γ (e.g., twenty-five minutes) or more. Specifically, at S20, the microcomputer 8 determines whether the value of the de-energization counter is equal to or greater than the predetermined time γ. If the motor 2 remains de-energized for the predetermined time γ or more corresponding to YES at S20, the ECU temperature estimation process proceeds to S21, where the microcomputer 8 resets an estimated temperature thecu of the ECU 7 to zero. It is noted that resetting the ECU estimated temperature thecu to zero means setting the ECU estimated temperature thecu to the ambient temperature that is preset in the microcomputer 8.

In contrast, if the motor 2 remains de-energized for a time period less than the predetermined time γ corresponding to NO at S20, the ECU temperature estimation process proceeds to S22.

At S22, the microcomputer 8 determines whether the driver performs the switching operation of the shift range by operating the shift lever. As mentioned previously, when the driver performs the switching operation of the shift range, the motor flag is turned ON from OFF. That is, at S22, the microcomputer 8 determines whether the motor flag is ON. If the switching operation of the shift range is performed corresponding to YES at S22, the ECU temperature estimation process proceeds to S23.

At S23, the microcomputer 8 determines whether the motor 2 needs to be feedback controlled. As mentioned previously, when the motor 2 needs to be feedback controlled, the open flag is OFF. That is, at S23, the microcomputer 8 determines whether the open flag is OFF. If the motor 2 needs to be feedback controlled corresponding to YES at S23, the ECU temperature estimation process proceeds to S24.

At S24, the microcomputer 8 determines whether the ECU estimated temperature thecu is equal to or greater than the threshold temperature X4° C., i.e., determines whether thecu≥X4. As shown in FIG. 6, the fourth unit temperature increase of the ECU 7 changes at the threshold temperature X4. If the ECU estimated temperature thecu is equal to or greater than the threshold temperature X4° C. corresponding to YES at S24, the ECU temperature estimation process proceeds to S25, where the microcomputer 8 adds a value E1° C. to the ECU estimated temperature thecu (i.e., thecu+=E1).

The value E1° C. is the fourth unit temperature increase indicated by the solid arrow K in FIG. 6.

In contrast, if the ECU estimated temperature thecu is less than the threshold temperature X4° C. corresponding to NO at S24, the ECU temperature estimation process proceeds to S26, where the microcomputer 8 adds a value E2° C. to the ECU estimated temperature thecu (i.e., thecu+=E2).

The value E2° C. is the fourth unit temperature increase indicated by the solid arrow L in FIG. 6.

In contrast, if the motor 2 needs to be open-loop controlled corresponding to NO at S23, the ECU temperature estimation process proceeds to S27.

As S27, the microcomputer 8 determines whether the ECU estimated temperature thecu is equal to or greater than a predetermined temperature X6° C., i.e., determines whether thecu X6° C. The predetermined value X6° C. is obtained in the experiments. If the ECU estimated temperature thecu is equal to or greater than the predetermined temperature X6° C. corresponding to YES at S27, the ECU temperature estimation process proceeds to S28, where the microcomputer 8 adds a value E3° C. to the ECU estimated temperature thecu (i.e., thecu+=E3).

In contrast, if the ECU estimated temperature thecu is less than the predetermined temperature X6° C. corresponding to NO at S27, the ECU temperature estimation process proceeds to S29, where the microcomputer 8 adds a value E4° C. to the ECU estimated temperature thecu (i.e., thecu+=E4).

In contrast, if the switching operation of the shift range is not performed corresponding to NO at S22, the ECU temperature estimation process proceeds to S30 shown in FIG. 10.

At S30, the microcomputer 8 determines whether the driver turns ON the ignition switch 12 so that the initial learning process for initializing the motor 2 can be started. As mentioned previously, when the initial learning process is started, the motor 2 switches to the initialization mode. That is, at S30, the microcomputer 8 determines whether the motor 2 is in the initialization mode. If the initial learning process is started corresponding to YES at S30, the ECU temperature estimation process proceeds to S31.

At S31, the microcomputer 8 determines whether the ECU estimated temperature thecu is equal to or greater than the threshold temperature X2° C., i.e., determines whether thecu X2. As shown in FIG. 4, the second unit temperature increase changes at the threshold temperature X2. If the ECU estimated temperature thecu is equal to or greater than the threshold temperature X2° C. corresponding to YES at S31, the ECU temperature estimation process proceeds to S32, where the microcomputer 8 adds a value E5° C. to the ECU estimated temperature thecu (i.e., thecu+=E5).

The value E5° C. is the second unit temperature increase indicated by the solid arrow D in FIG. 4.

In contrast, if the ECU estimated temperature thecu is less than the threshold temperature X2° C. corresponding to NO at S31, the ECU temperature estimation process proceeds to S33, where the microcomputer 8 adds a value E6° C. to the ECU estimated temperature thecu (i.e., thecu+=E6).

The value E6° C. is the second unit temperature increase indicated by the solid arrow E in FIG. 4.

In contrast, if the initial learning process is not started corresponding to NO at S30, the ECU temperature estimation process proceeds to S34.

At S34, the microcomputer 8 determines whether the motor 2 remains de-energized for a predetermined time δ or more. Specifically, at S34, the microcomputer 8 determines whether the value of the ECU standby counter is equal to or greater than the predetermined time δ. If the motor 2 remains de-energized for the predetermined time δ or more corresponding to YES at S34, the ECU temperature estimation process proceeds to S35.

At S35, the microcomputer 8 determines whether the ECU estimated temperature thecu is equal to or greater than the threshold temperature X3° C., i.e., determines whether thecu X3. As shown in FIGS. 4 and 6, each of the second unit temperature decrease and the fourth unit temperature decrease changes at the threshold temperature X3. If the ECU estimated temperature thecu is equal to or greater than the threshold temperature X3° C. corresponding to YES at S35, the ECU temperature estimation process proceeds to S36, where the microcomputer 8 subtracts a value E7° C. from the ECU estimated temperature thecu (i.e., thecu−=E7). After S36, the ECU temperature estimation process proceeds to S37, where the microcomputer 8 resets the ECU standby counter.

In contrast, if the ECU estimated temperature thecu is less than the threshold temperature X3° C. corresponding to NO at S35, the ECU temperature estimation process proceeds to S38. At S38, the microcomputer 8 determines whether the ECU estimated temperature thecu is equal to or greater than a predetermined temperature X7° C., i.e., determines whether thecu≥X7. It is noted that the temperature X7 is slightly (e.g., 10° C.) higher than the ambient temperature. The temperature X7 is set, based on the ECU temperature characteristics that decreases in a quadratic manner as shown in FIGS. 4 and 6, so that the temperature of the ECU 7 can decrease at a very slow rate.

If the ECU estimated temperature thecu is equal to or greater than the predetermined temperature X7° C. corresponding to YES at S38, the ECU temperature estimation process proceeds to S39, where the microcomputer 8 subtracts a value M8° C. from the ECU estimated temperature thecu (i.e., thecu−=E8). After S39, the ECU temperature estimation process proceeds to S37, where the microcomputer 8 resets the ECU standby counter.

In contrast, if the ECU estimated temperature thecu is less than the predetermined temperature X7° C. corresponding to NO at S38, the ECU temperature estimation process proceeds to S40, where the microcomputer 8 maintains the ECU estimated temperature thecu unchanged. Thus when the ECU estimated temperature thecu is equal to or slightly (e.g., 10° C.) greater than the ambient temperature, the ECU estimated temperature thecu is not subject to subtraction.

When finishing the ECU temperature estimation process, the microcomputer 8 repeats the above-described S1-S40 after performing S41-S48, which are described below.

Next, a heat generation evaluation process performed by the microcomputer 8 to evaluate heat generated in the motor 2 and the ECU 7 is described below with reference to FIG. 11. The microcomputer 8 performs the heat generation evaluation process after ending the ECU temperature estimation process.

As described above, the microcomputer 8 calculates the motor estimated temperature thact and the ECU estimated temperature thecu through S1-S40. The microcomputer 8 evaluates and controls the heat generated in the motor 2 and the ECU 7 based on the motor estimated temperature thact and the ECU estimated temperature thecu by performing the heat generation evaluation process.

Figure 11:
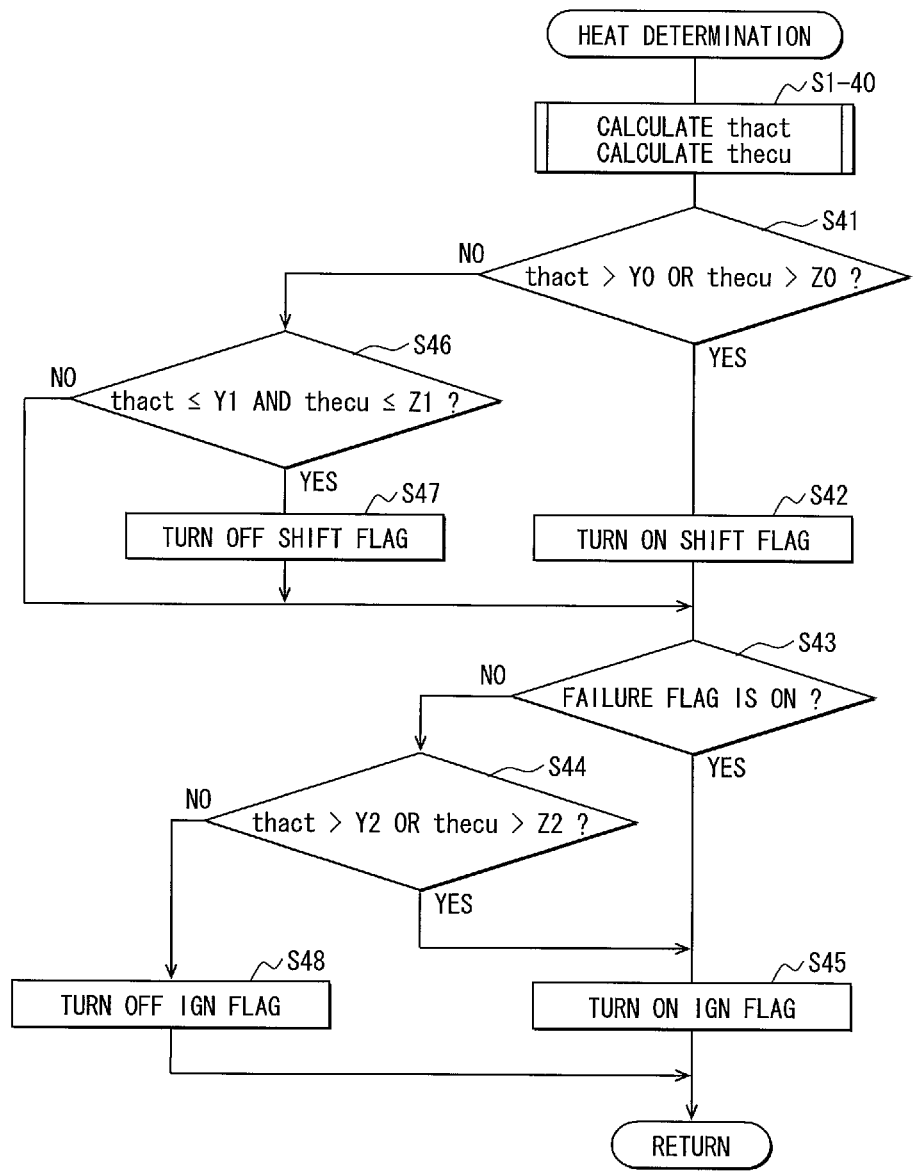
FIG. 11 is a diagram illustrating a flow chart of a heat determination process performed by the ECU to determine the amount of heat generated in the motor and the ECU.

As shown in FIG. 11, the heat generation evaluation process proceeds to S41, where the microcomputer 8 determines whether the motor estimated temperature thact is greater than the motor allowable temperature limit Y0 or the ECU estimated temperature thecu is greater than the ECU allowable temperature limit Z0.

If the motor estimated temperature thact is greater than the motor allowable temperature limit Y0 or the ECU estimated temperature thecu is greater than the ECU allowable temperature limit Z0 corresponding to YES at S41, the heat generation evaluation process proceeds to S42, where the microcomputer 8 turns ON a shift flag. Even when the driver operates the shift lever to switch the shift range under a condition that the shift flag is ON, the energization to the motor 2 from the motor drivers 9 and 10 is interrupted so that the operations of the ECU 7 and the motor 2 can be prohibited. For example, when the driver operates the shift lever to switch the shift range under the condition that the shift flag is ON, a warning indicator 27 shown in FIG. 1 can call attention to the driver by sound, image, or the like. The warning indicator 27 can be a lamp, a display device, or the like.

After S42, the heat generation evaluation process proceeds to S43, where the microcomputer 8 determines whether the microcomputer 8 fails to read a stored temperature increase value. If the microcomputer 8 does not fail to read the stored temperature increase value corresponding to NO at S43, the microcomputer 8 turns OFF a failure flag, and the heat generation evaluation process proceeds to S44.

At S44, the microcomputer 8 determines whether the motor estimated temperature thact is greater than a second motor removal temperature Y2 or the ECU estimated temperature thecu is greater than a second ECU removal temperature Z2.

The second motor removal temperature Y2 is lower than the motor allowable temperature limit Y0. The second ECU removal temperature Z2 is lower than the ECU allowable temperature limit Z0. A difference between the second motor removal temperature Y2 and the motor allowable temperature limit Y0 can be adjusted according to the type of vehicle to which the shift range switcher 1 is applied. Likewise, a difference between the second ECU removal temperature Z2 and the ECU allowable temperature limit Z0 can be adjusted according to the type of vehicle to which the shift range switcher 1 is applied. For example, the second motor removal temperature Y2 can be calculated by subtracting one ignition-ON motor temperature and two range switching motor temperatures from the motor allowable temperature limit Y0. The ignition-ON motor temperature corresponds to the amount of heat generated in the motor 2 when the motor 2 is initialized by the turn-ON of the ignition switch 12. The range switching motor temperature corresponds to the amount of heat generated in the motor 2 when the motor 2 is driven to switch the shift range in response to the operation of the shift lever. For example, two range switching motor temperatures can correspond to the total amount of heat generated in the motor 2 when the driver continuously moves the shift lever from the P range to the not-P range and back to the P range. Likewise, the second ECU removal temperature Z2 can be calculated by subtracting one ignition-ON ECU temperature and two range switching ECU temperatures from the ECU allowable temperature limit Z0. The ignition-ON ECU temperature corresponds to the amount of heat generated in the ECU 7 when the motor 2 is initialized by the turn-ON of the ignition switch 12. The range switching ECU temperature corresponds to the amount of heat generated in the ECU 7 when the motor 2 is driven to switch the shift range in response to the operation of the shift lever. For example, two range switching ECU temperatures can correspond to the total amount of heat generated in the ECU 7 when the driver continuously moves the shift lever from the P range to the not-P range and back to the P range.

As mentioned above, the second motor removal temperature Y2 is lower than the motor allowable temperature limit Y0, and the second ECU removal temperature Z2 is lower than the ECU allowable temperature limit Z0. Therefore, when the heat generation evaluation process proceeds to S44 through S42, the heat generation evaluation process always proceeds to S45, corresponding to YES at S44, where the microcomputer 8 turns ON an ignition flag.

In contrast, if the microcomputer 8 fails to read the stored temperature increase value corresponding to YES at S43, the microcomputer 8 turns ON the failure flag, and the heat generation evaluation process proceeds to S45, where the microcomputer 8 turns ON the ignition flag.

Even when the driver operates the ignition switch 12 under a condition that the ignition flag is ON, the energization to the motor 2 from the motor drivers 9 and 10 is interrupted so that the operations of the ECU 7 and the motor 2 including the initialization can be prohibited.

For example, when the driver operates the ignition switch 12 under the condition that the ignition flag is ON, the warning indicator 27 shown in FIG. 1 can call attention to the driver by sound, image, or the like.

If the motor estimated temperature thact is equal to or less the motor allowable temperature limit Y0 and the ECU estimated temperature thecu is equal to or less than the ECU allowable temperature limit Z0 corresponding to NO at S41, the heat generation evaluation process proceeds to S46.

At S46, the microcomputer 8 determines whether the motor estimated temperature thact is equal to or less than a first motor removal temperature Y1 and the ECU estimated temperature thecu is equal to or less than a first ECU removal temperature Z1.

The first motor removal temperature Y1 is lower than the motor allowable temperature limit Y0. The first ECU removal temperature Z1 is lower than the ECU allowable temperature limit Z0. A difference between the first motor removal temperature Y1 and the motor allowable temperature limit Y0 can be adjusted according to the type of vehicle to which the shift range switcher 1 is applied. Likewise, a difference between the first ECU removal temperature Z1 and the ECU allowable temperature limit Z0 can be adjusted according to the type of vehicle to which the shift range switcher 1 is applied. For example, the first motor removal temperature Y1 can be calculated by subtracting a motor cooling temperature from the motor allowable temperature limit Y0. The motor cooling temperature corresponds to the amount of heat released from the motor 2 when the motor 2 remains de-energized for a predetermined period (e.g., ten seconds). Likewise, the first ECU removal temperature Z1 can be calculated by subtracting an ECU cooling temperature from the ECU allowable temperature limit Z0. The ECU cooling temperature corresponds to the amount of heat released from the ECU 7 when the motor 2 remains de-energized for a predetermined period (e.g., ten seconds).

If the motor estimated temperature thact is equal to or less the motor allowable temperature limit Y0 and the ECU estimated temperature thecu is equal to or less than the ECU allowable temperature limit Z0 corresponding to YES at S46, the heat generation evaluation process proceeds to S47, where the microcomputer 8 turns OFF the shift flag. Thus, the operations of the ECU 7 and the motor 2 are allowed so that the driver can switch the shift range by operating the shift lever.

In contrast, if the motor estimated temperature thact is greater than the motor allowable temperature limit Y0 or the ECU estimated temperature thecu is greater the ECU allowable temperature limit Z0 corresponding to NO at S46, the heat generation evaluation process proceeds to S43 while maintaining the shift flag ON.

If the microcomputer 8 does not fail to read the stored temperature increase value corresponding to NO at S43, the heat generation evaluation process proceeds to S44.

At S44, if the motor estimated temperature thact is equal to or less than the second motor removal temperature Y2 and the ECU estimated temperature thecu is equal to or less than the second ECU removal temperature Z2 corresponding to NO at S44, the heat generation evaluation process proceeds to S48, where the microcomputer 8 turns OFF the ignition flag. Thus, the operations of the ECU 7 and the motor 2 are allowed so that the initial learning of the motor 2 can be performed when the driver turns ON the ignition switch 12.

The microcomputer 8 repeats the above-described S1-S48.

Figure 12A:
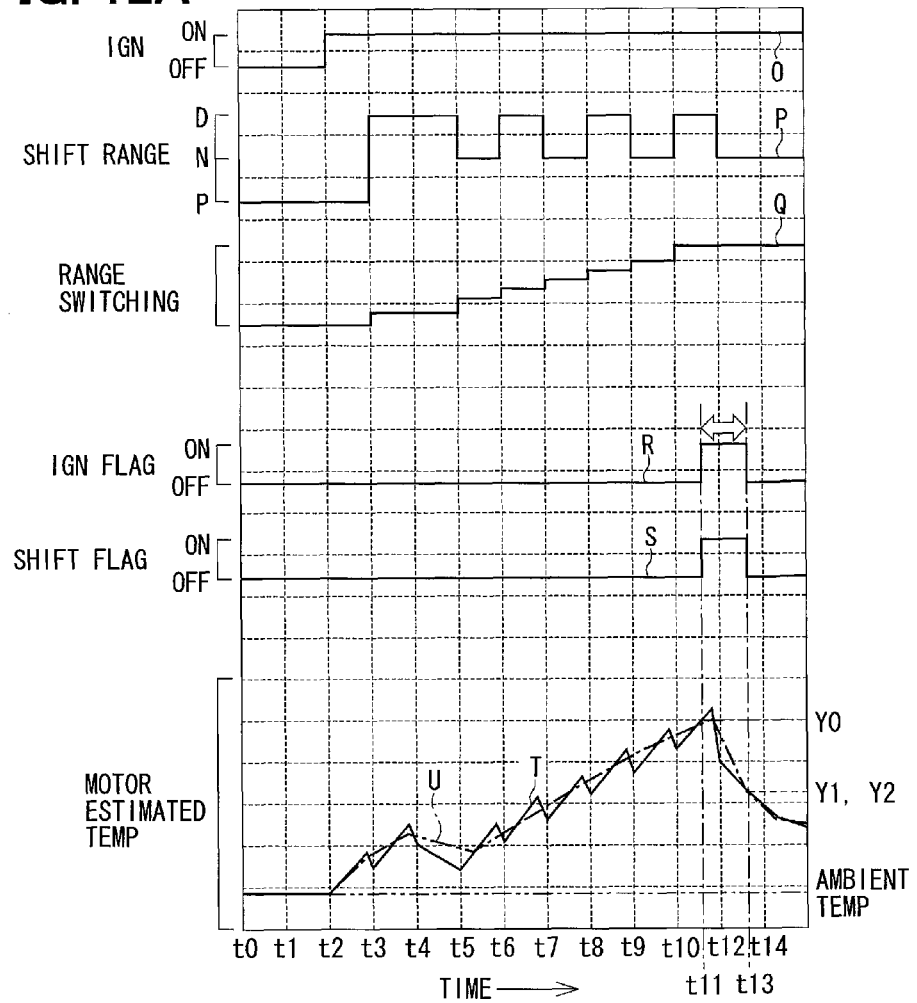
FIG. 12A is a diagram illustrating a timing chart of the shift range switcher of FIG. 1.
Figure 12B:
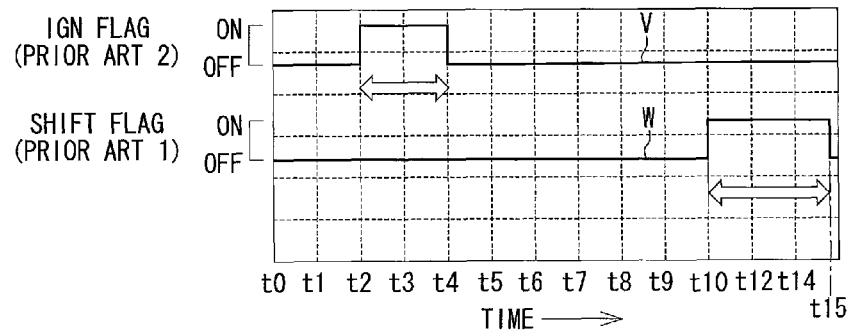
FIG. 12B is a diagram illustrating timing charts of conventional shift range switchers.

FIG. 12A shows a timing chart of the shift range switcher 1 according to the first embodiment. FIG. 12B shows timing charts of the conventional shift range switchers disclosed in US 2008/0024081 (denoted as Prior Art 2 in FIG. 12B) and US 2011/0175563 (denoted as Prior Art 1 in FIG. 12B).

In each of the shift range switcher 1 and the conventional shift range switchers, the driver turns ON the ignition switch 12 at a time t2 as indicated by a solid line O and operates the shift lever at times t3, t5-t10, and t12 to switch the shift range as indicated by a solid line P. As indicated by a solid line Q, the number of times the motor 2 is operated to switch the shift range is counted by the microcomputer 8.

In the shift range switcher 1 according to the first embodiment, as indicated by a solid line T, the microcomputer 8 adds the motor temperature increase caused by the turn-ON of the ignition switch 12 or caused by the switching of the shift range and subtracts the motor temperature decrease caused by the de-energization of the motor 2 to and from the motor estimated temperature initialized to the ambient temperature. In such an approach, the motor estimated temperature calculated by the microcomputer 8 indicated by the solid line T can approximate the real temperature of the motor 2 indicated by a dashed line U. Accordingly, as indicated by solid lines R and S, when the motor estimated temperature reaches the motor allowable temperature limit Y0 at a time t11, the microcomputer 8 prohibits the energization to the motor 2 triggered by the operation to turn ON the ignition switch 12 and triggered by the operation to switch the shift range.

Then, the microcomputer 8 removes the prohibition of the energization to the motor 2 triggered by the operation to switch the shift range at a time t13 when the motor estimated temperature decreases to the first motor removal temperature Y1. In an example shown in FIG. 12A, the first motor removal temperature Y1 is equal to the second motor removal temperature Y2. Therefore, the microcomputer 8 removes the prohibition of the energization to the motor 2 triggered by the operation to turn ON the ignition switch 12 at the time t13.

In contrast, in the conventional shift range switcher according to the prior art 1, as indicated by a solid line V, when the ignition switch 12 is turned ON at the time t2, the motor 2 is prohibited from operating for initialization for a predetermined time period from the time t2 to the time t4.

In the conventional shift range switcher according to the prior art 2, as indicated by a solid line W, when the number of times the shift range is switched reaches a predetermined number at a time t10, the motor 2 is prohibited from operating to switch the shift range for a predetermined time period from the time t10 to a time t15.

Advantages of the first embodiment can be summarized as follows.

(1) The microcomputer 8 of the ECU 7 adds the motor temperature increase caused by the turn-ON of the ignition switch 12 or caused by the switching of the shift range and subtracts the motor temperature decrease caused by the de-energization of the motor 2 to and from the motor estimated temperature. In such an approach, the motor estimated temperature calculated by the microcomputer 8 can approximate the real temperature of the motor 2.

Therefore, even when the driver continuously performs the operation to turn ON the ignition switch 12 or the operation to switch the shift range, the motor 2 and the ECU 7 can respond to the operations performed by the driver almost until the real temperatures of the motor 2 and the ECU 7 reach the respective allowable temperature limits Y0, Z0. Thus, unnecessary prohibition of the operations of the motor 2 and the ECU 7 can be reduced.

(2) The microcomputer 8 removes the prohibition of the operations of the motor 2 and the ECU 7 almost at the same time as the real temperatures of the motor 2 and the ECU 7 reach the respective allowable temperature limits Y0, Z0. Thus, the unnecessary prohibition of the operations of the motor 2 and the ECU 7 can be reduced.

(3) The microcomputer 8 changes the ECU temperature increase caused by the turn-ON of the ignition switch 12 or caused by the switching of the shift range based on the estimated temperature of the ECU 7. Further, the microcomputer 8 changes the ECU temperature decrease and the motor temperature decrease caused by the de-energization of the motor 2 based on the estimated temperatures of the ECU 7 and the motor 2. In such an approach, the ECU estimated temperature calculated by the microcomputer 8 can approximate the real temperature of the ECU 7, and the motor estimated temperature calculated by the microcomputer 8 can approximate the real temperature of the motor 2.

(4) The microcomputer 8 removes the prohibition of the operations of the ECU7 and the motor 2 triggered by the operation to switch the shift range based on the first motor removal temperature Y1 and the first ECU removal temperature Z1. Further, the microcomputer 8 removes the prohibition of the operations of the ECU7 and the motor 2 triggered by the operation to turn ON the ignition switch 12 based on the second motor removal temperature Y2 and the second ECU removal temperature Z2.

That is, the microcomputer 8 can remove the prohibition of the operations of the ECU7 and the motor 2 triggered by the operation to switch the shift range while maintaining the prohibition of the operations of the ECU7 and the motor 2 triggered by the operation to turn ON the ignition switch 12. In other words, the microcomputer 8 can remove the prohibition of the operations of the ECU7 and the motor 2 triggered by the operation to turn ON the ignition switch 12 while maintaining the prohibition of the operations of the ECU7 and the motor 2 triggered by the operation to switch the shift range.

(5) The first motor removal temperature Y1, the first ECU removal temperature Z1, the second motor removal temperature Y2, and the second ECU removal temperature Z2 are adjusted according to the type of vehicle to which the shift range switcher 1 is applied. Thus, a rime period where the motor 2 and the ECU 7 remain prohibited from operating can be adjusted.

Second Embodiment

A shift range switcher 100 according to a second embodiment of the present disclosure is described below with reference to FIGS. 13-16. A difference between the first embodiment and the second embodiment is as follows.

Figure 13:
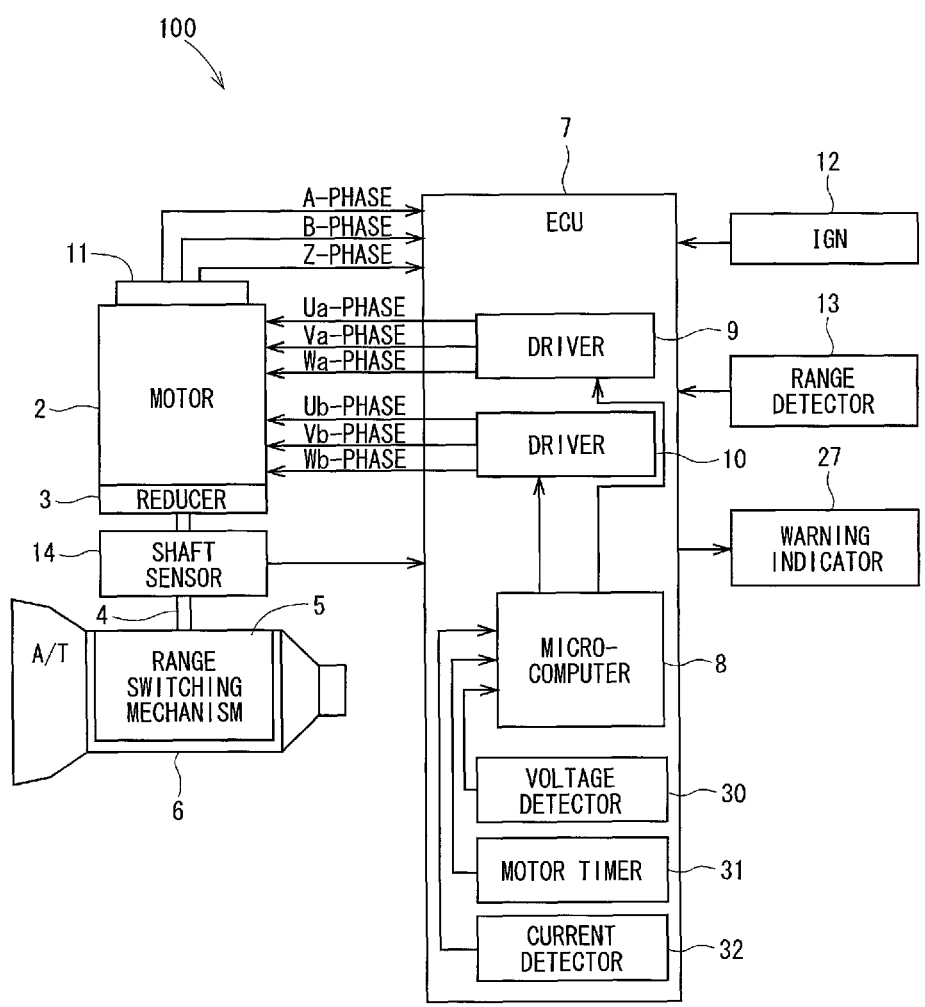
FIG. 13 is a block diagram of a shift range switcher according to a second embodiment of the present disclosure.

As shown in FIG. 13, according to the second embodiment, the ECU 7 further includes a voltage detector 30, a motor timer 31 and a current detector 32.

The voltage detector 30 detects a voltage supplied to the motor 2 from the motor drivers 9 and 10.

The current detector 32 a current supplied to the motor 2 from the motor drivers 9 and 10.

The motor timer 31 detects an operating time of the motor 2. The operating time of the motor 2 is measured based on a time period during which power is supplied to the motor 2 from the motor drivers 9 and 10.

The voltage detected by the voltage detector 30, the motor operating time detected by the motor timer 31, and the current detected by the current detector 32 are inputted to the microcomputer 8 of the ECU 7.

In an example shown in FIG. 13, the ECU 7 includes all of the voltage detector 30, the motor timer 31, and the current detector 32. Alternatively, the ECU 7 can include at least one of the voltage detector 30, the motor timer 31, and the current detector 32.

In a first case described below, it is assumed that the ECU 7 includes only the voltage detector 30.

When the microcomputer 8 calculates the motor estimated temperature thact and the ECU estimated temperature thecu, the microcomputer 8 changes the first unit temperature increase and the third unit temperature increase according to the voltage detected by the voltage detector 30. As mentioned previously, the first and third unit temperature increases are added to the motor and ECU estimated temperatures thact, thecu, respectively, whenever the driver turns ON the ignition switch 12.

Likewise, the microcomputer 8 changes the second unit temperature increase and the fourth unit temperature increase according to the voltage detected by the voltage detector 30. As mentioned previously, the second and fourth unit temperature increases are added to the motor and ECU estimated temperatures thact, thecu, respectively, whenever the driver performs the switching operation of the shift range.

Specifically, the microcomputer 8 changes the unit temperature increase in such a manner that the unit temperature increase increases with an increase in the voltage detected by the voltage detector 30 and that the unit temperature increase decreases with a decrease in the voltage detected by the voltage detector 30.

Figure 14:
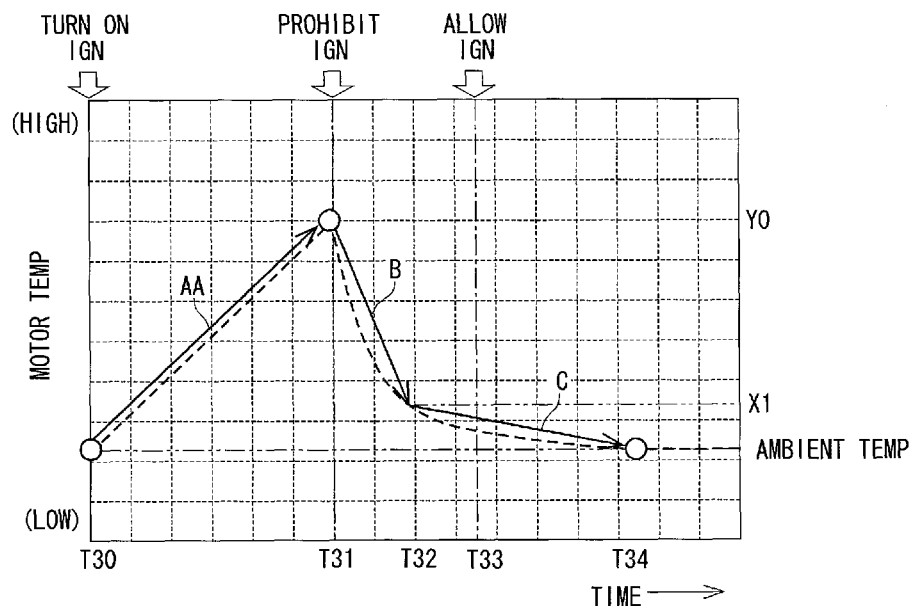
FIG. 14 is a diagram illustrating a behavior of a temperature of a motor of the shift range switcher of FIG. 13 when the ignition switch is turned ON and OFF.
Figure 15:
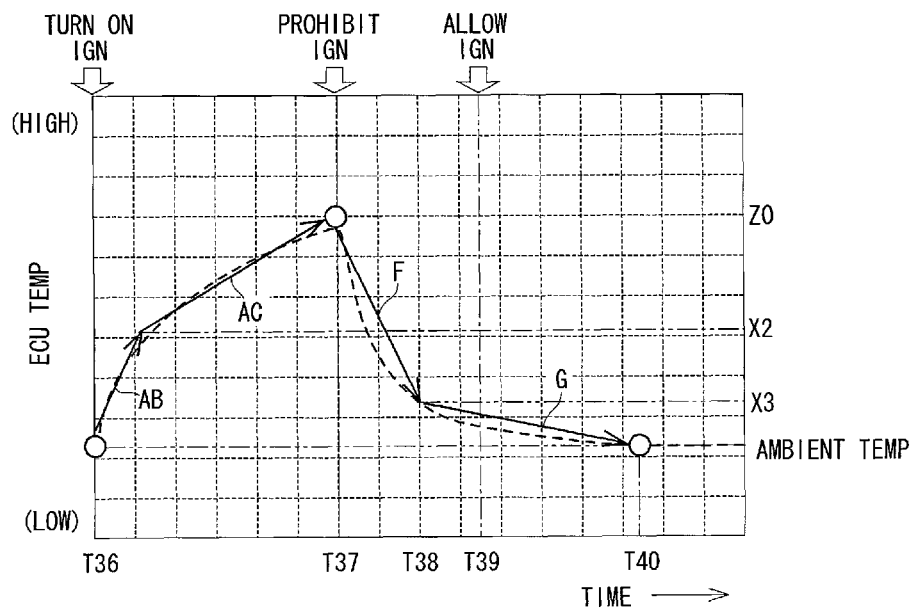
FIG. 15 is a diagram illustrating a behavior of a temperature of an ECU of the shift range switcher of FIG. 13 when the ignition switch is turned ON and OFF.

FIG. 14 shows a behavior of a temperature of the motor 2 when the driver performs a continuous ON and OFF operation of the ignition switch 12, and FIG. 15 shows a behavior of a temperature of the ECU 7 when the driver performs the continuous ON and OFF operation of the ignition switch 12.

As described in the first embodiment, the behaviors of the temperatures of the motor 2 and the ECU 7 shown in FIGS. 3, 4, 5, and 6 are based on the premise that a voltage of 15 volts as a maximum voltage of the vehicle is supplied to the motor 2 from the ECU 7.

In contrast, the behaviors of the temperatures of the motor 2 and the ECU 7 shown in FIGS. 14 and 15 are based on the premise that a voltage of 9 volts as a minimum voltage of the vehicle is supplied to the motor 2 from the ECU 7.

Firstly, the behavior of the temperature of the motor 2 is described below with reference to FIG. 14. In FIG. 14, a broken line represents the behavior of the temperatures of the motor 2 observed in experiments, and a solid arrow represents the behavior of the temperature of the motor 2 estimated by the microcomputer 8 of the ECU 7.

As shown in FIG. 14, at a time T30, the real temperature of the motor 2 is almost equal to the ambient temperature. As mentioned in the first embodiment, the ambient temperature corresponds to the maximum usage temperature of the vehicle. After the driver starts the continuous ON and OFF operation of the ignition switch 12 at the time T30, the real temperature of the motor 2 increases linearly. It is noted that a rate at which the real temperature of the motor 2 increases is smaller in FIG. 14 than in FIG. 3, because the voltage supplied to the motor 2 is smaller in FIG. 14 than in FIG. 3.

When the microcomputer 8 determines, at a time T31, that the temperature of the motor 2 reaches the motor allowable temperature limit Y0, the microcomputer 8 prohibits the operations of the ECU 7 and the motor 2 by interrupting the energization to the motor 2 from the motor drivers 9 and 10. As a result, the real temperature of the motor 2 decreases in a quadratic manner from the time T31 through a time T34.

The behavior of the real temperature of the motor 2 from the time T31 through the time T34 shown in FIG. 14 is the same as the behavior of the real temperature of the motor 2 from the time T1 through the time T4 shown in FIG. 3.

The microcomputer 8 changes the first unit temperature increase added to the motor estimated temperature according to the voltage supplied to the motor 2 from the ECU 7 by detecting the voltage using the voltage detector 30. A relationship between the first unit temperature increase and the voltage is measured in experiments and preset in the microcomputer 8. Since the voltage supplied to the motor 2 is lower in the second embodiment than in the first embodiment, the first unit temperature increase added to the motor estimated temperature is smaller in the second embodiment than in the first embodiment. Thus, the microcomputer 8 estimates the temperature of the motor 2 as indicated by a solid arrow AA in FIG. 14.

Next, the behavior of the temperature of the ECU 7 is described below with reference to FIG. 15. In FIG. 15, a broken line represents the behavior of the temperatures of the ECU 7 observed in experiments, and a solid arrow represents the behavior of the temperature of the ECU 7 estimated by the microcomputer 8 of the ECU 7.

As shown in FIG. 15, at a time T36, the real temperature of the ECU 7 is almost equal to the ambient temperature. After the driver starts the continuous ON and OFF operation of the ignition switch 12 at the time T36, the real temperature of the ECU 7 increases in a quadratic manner. It is noted that a rate at which the real temperature of the ECU 7 increases is smaller in FIG. 15 than in FIG. 4, because the voltage supplied to the motor 2 is smaller in FIG. 15 than in FIG. 4.

When the microcomputer 8 determines, at a time T37, that the temperature of the motor 2 reaches the ECU allowable temperature limit Z0, the microcomputer 8 prohibits the operations of the ECU 7 and the motor 2 by interrupting the energization to the motor 2 from the motor drivers 9 and 10. As a result, the real temperature of the ECU 7 decreases in a quadratic manner from the time T37 through a time T40.

The behavior of the real temperature of the ECU 7 from the time T37 through the time T40 shown in FIG. 15 is the same as the behavior of the real temperature of the ECU 7 from the time T7 through the time T10 shown in FIG. 4.

The microcomputer 8 changes the third unit temperature increase added to the ECU estimated temperature according to the voltage supplied to the motor 2 from the ECU 7 by detecting the voltage using the voltage detector 30. A relationship between the third unit temperature increase and the voltage is measured in experiments and preset in the microcomputer 8. Since the voltage supplied to the motor 2 is lower in the second embodiment than in the first embodiment, the third unit temperature increase added to the ECU estimated temperature is smaller in the second embodiment than in the first embodiment. Thus, the microcomputer 8 estimates the temperature of the ECU 7 as indicated by solid arrows AB and AC in FIG. 15.

A drawing, illustrating behaviors of the temperatures of the motor 2 and the ECU 7 when the driver continuously moves the shift lever from the P range to the not-P range and back to the P range, is omitted. In this case, the amount of heat generated in the motor 2 and the ECU 7 is smaller, as the voltage supplied from the ECU 7 to the motor 2 is smaller. Therefore, the microcomputer 8 changes the unit temperature increase added to the estimated temperatures of the ECU 7 and the motor 2 in such a manner that the unit temperature increase decreases with a decrease in the voltage detected by the voltage detector 30.

In a second case described below, it is assumed that the ECU 7 includes only the current detector 32.

When the microcomputer 8 calculates the motor estimated temperature thact and the ECU estimated temperature thecu, the microcomputer 8 changes the first unit temperature increase and the third unit temperature increase according to the current detected by the current detector 32. Likewise, the microcomputer 8 changes the second unit temperature increase and the fourth unit temperature increase according to the current detected by the current detector 32. Specifically, the microcomputer 8 changes the unit temperature increase in such a manner that the unit temperature increase increases with an increase in the current detected by the current detector 32 and that the unit temperature increase decreases with a decrease in the current detected by the current detector 32.

In a third case described below, it is assumed that the ECU 7 includes only the motor timer 31.

When the microcomputer 8 calculates the motor estimated temperature thact and the ECU estimated temperature thecu, the microcomputer 8 changes the first unit temperature increase and the third unit temperature increase according to the motor operating time detected by the motor timer 31. Likewise, the microcomputer 8 changes the second unit temperature increase and the fourth unit temperature increase according to the motor operating time detected by the motor timer 31.

Specifically, the microcomputer 8 changes the unit temperature increase in such a manner that the unit temperature increase increases with an increase in the motor operating time detected by the motor timer 31 and that the unit temperature increase decreases with a decrease in the motor operating time detected by the motor timer 31.

In summary, the microcomputer 8 can set the unit temperature increase according to at least one of the voltage, the current, and the motor operating time detected by the voltage detector 30, the current detector 32, and the motor timer 31, respectively.

Accuracy of the unit temperature increase can be improved by setting the unit temperature increase according to at least two of the voltage, the current, and the motor operating time.

Figure 16:
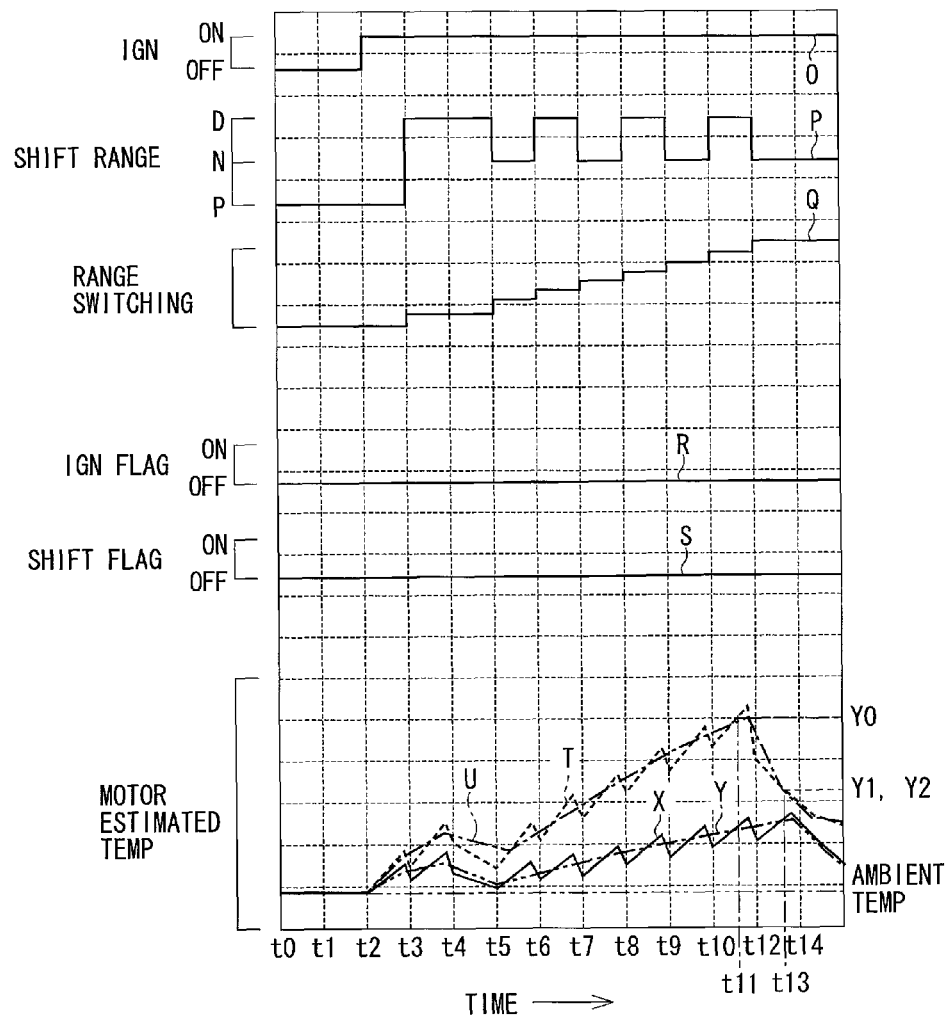
FIG. 16 is a diagram illustrating a timing chart of the shift range switcher of FIG. 13.

FIG. 16 shows a timing chart of the shift range switcher 100 according to the second embodiment.

In an example shown in FIG. 16, the driver turns ON the ignition switch 12 at a time t2 as indicated by a solid line O and operates the shift lever at times t3, t5-t10, and t12 to switch the shift range as indicated by a solid line P. As indicated by a solid line Q, the number of times the motor 2 is operated to switch the shift range is counted by the microcomputer 8.

In FIG. 16, a broken line T represents the estimated temperature of the motor 2 when a maximum voltage (e.g., 15 volts) of the vehicle is supplied to the motor 2 from the ECU 7, and a chained line U represents the real temperature of the motor 2 when the maximum voltage is supplied to the motor 2.

Further, in FIG. 16, a solid line X represents the estimated temperature of the motor 2 when a minimum voltage (e.g., 9 volts) of the vehicle is supplied to the motor 2 from the ECU 7, and a chained line Y represents the real temperature of the motor 2 when the minimum voltage is supplied to the motor 2.

When the minimum voltage is supplied to the motor 2, the microcomputer 8 reduces the unit temperature increase added to the motor estimated temperature so that the motor estimated temperature indicated by the solid line X can approximate the motor real temperature indicated by the chained line Y. As a result, there is a margin of time before the motor estimated temperature reaches the motor removal temperatures Y1, Y2. Therefore, as indicated by solid lines R and S, the microcomputer 8 does not prohibit the energization to the motor 2 from the motor drivers 9 and 10 at a time t11. Thus, the motor 2 and the ECU 7 can respond to the operations performed by the driver even after a time t12.

As described above, according to the second embodiment, the microcomputer 8 sets the unit temperature increases added to the estimated temperatures of the ECU 7 and the motor 2 according to the voltage, the current, or the motor operating time detected by the voltage detector 30, the current detector 32, and the motor timer 31, respectively. In such an approach, as the voltage, the current, or the motor operating time is smaller, the number of times the motor 2 is driven before the energization to the motor 2 is prohibited becomes larger.

Accuracy of the unit temperature increase can be much improved by setting the unit temperature increase according to all of the voltage, the current, and the motor operating time.

(Modifications)

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

In the embodiments, the microcomputer 8 prohibits the operations of the ECU 7 and the motor 2, when the estimated temperature of the ECU 7 reaches the allowable temperature limit Z0 of the ECU 7 or when the estimated temperature of the motor 2 reaches the allowable temperature limit Y0 of the motor 2. Alternatively, the microcomputer 8 can restrict the operations of the ECU 7 and the motor 2 by restricting the current supplied to the motor 2, when the estimated temperature of the ECU 7 reaches the allowable temperature limit Z0 of the ECU 7 or when the estimated temperature of the motor 2 reaches the allowable temperature limit Y0 of the motor 2.

In the embodiments, the first motor removal temperature Y1 and the second motor removal temperature Y2 are the same, and the first ECU removal temperature Z1 and the second ECU removal temperature Z2 are the same. In such an approach, the microcomputer 8 removes the prohibition of the operations of the ECU 7 and the motor 2 triggered by the operation to turn ON the ignition switch 12 at the same time as the microcomputer 8 removes the prohibition of the operations of the ECU7 and the motor 2 triggered by the operation to switch the shift range. Alternatively, the first motor removal temperature Y1 and the second motor removal temperature Y2 can be different from each other, or the first ECU removal temperature Z1 and the second ECU removal temperature Z2 can be different from each other. In such an approach, the microcomputer 8 can remove the prohibition of the operations of the ECU 7 and the motor 2 triggered by the operation to turn ON the ignition switch 12 at a different time from when the microcomputer 8 removes the prohibition of the operations of the ECU7 and the motor 2 triggered by the operation to switch the shift range.

What is claimed is:

1. A shift range switcher comprising:
a motor configured to switch a shift range of a vehicle; and
an electronic control unit (ECU) configured to supply electric current to the motor according to an operation of a driver of the vehicle, the ECU configured to calculate an estimated temperature of the motor and an estimated temperature of the ECU, wherein
the ECU includes an ECU reference temperature setting section, an ECU temperature adder, an ECU temperature subtractor, a motor reference temperature setting section, a motor temperature adder, a motor temperature subtractor, and a heat controller,
the ECU reference temperature setting section sets the estimated temperature of the ECU to an ambient temperature when the ECU starts to calculate the estimated temperature of the ECU,
the ECU temperature adder adds a first temperature value to the estimated temperature of the ECU, the first temperature value corresponding to the amount of heat generated in the ECU when the motor is energized,
the ECU temperature subtractor subtracts a second temperature value from the estimated temperature of the ECU, the second temperature value corresponding to the amount of heat released from the ECU when the motor is de-energized,
the motor reference temperature setting section sets the estimated temperature of the motor to the ambient temperature when the ECU starts to calculate the estimated temperature of the motor,
the motor temperature adder adds a third temperature value to the estimated temperature of the motor, the third temperature value corresponding to the amount of heat generated in the motor when the motor is energized,
the motor temperature subtractor subtracts a fourth temperature value from the estimated temperature of the motor, the fourth temperature value corresponding to the amount of heat released from the motor when the motor is de-energized, and
the heat controller prohibits or restricts operations of the ECU and the motor when the estimated temperature of the ECU reaches an allowable temperature limit of the ECU or when the estimated temperature of the motor reaches an allowable temperature limit of the motor.

2. The shift range switcher according to claim 1, wherein
the ECU temperature adder adds the first temperature value to the estimated temperature of the ECU whenever an ignition switch of the vehicle is turned ON or whenever the shift range of the vehicle is switched, and
the ECU temperature adder changes the first temperature value according to the estimated temperature of the ECU.

3. The shift range switcher according to claim 1, wherein
the ECU temperature subtractor subtracts the second temperature value from the estimated temperature of the ECU whenever a predetermined time elapses during a de-energization period where the motor remains de-energized, and
the ECU temperature subtractor changes the second temperature value according to the estimated temperature of the ECU.

4. The shift range switcher according to claim 1, wherein
the motor temperature subtractor subtracts the fourth temperature value from the estimated temperature of the motor whenever a predetermined time elapses during a de-energization period where the motor remains de-energized, and
the motor temperature subtractor changes the fourth temperature value according to the estimated temperature of the motor.

5. The shift range switcher according to claim 1, wherein
the heat controller prohibits or restricts the operations of the ECU and the motor by interrupting or restricting the current supplied to the motor.

6. The shift range switcher according to claim 1, wherein
when the estimated temperature of the ECU decreases to a predetermined ECU removal temperature and when the estimated temperature of the motor decreases to a predetermined motor removal temperature, the heat controller removes prohibition or restriction of the operations of the ECU and the motor,
the ECU removal temperature is lower than the allowable temperature limit of the ECU, and
the motor removal temperature is lower than the allowable temperature limit of the motor.

7. The shift range switcher according to claim 1, wherein
the heat controller includes a first remover and a second remover,
when the estimated temperature of the ECU decreases to a predetermined first ECU removal temperature and when the estimated temperature of the motor decreases to a predetermined first motor removal temperature, the first remover removes prohibition or restriction of the operations of the ECU and the motor so that the ECU and the motor operate in response to a shift operation performed by the driver to switch the shift range,
when the estimated temperature of the ECU decreases to a predetermined second ECU removal temperature and when the estimated temperature of the motor decreases to a predetermined second motor removal temperature, the second remover removes the prohibition or the restriction of the operations of the ECU and the motor so that the ECU and the motor operate in response to an ignition operation performed by the driver to turn ON an ignition switch of the vehicle,
each of the first and second ECU removal temperatures is lower than the allowable temperature limit of the ECU, and
each of the first and second motor removal temperatures is lower than the allowable temperature limit of the motor.

8. The shift range switcher according to claim 7, wherein
the second motor removal temperature is calculated by subtracting an ignition-ON motor temperature and a range-shift motor temperature from the motor allowable temperature limit,
the ignition-ON motor temperature corresponds to the amount of heat generated in the motor when the ignition operation is performed a first number of times,
the range-shift motor temperature corresponds to the amount of heat generated in the motor when the shift operation is performed a second number of times,
the second ECU removal temperature is calculated by subtracting an ignition-ON ECU temperature and a range-shift ECU temperature from the ECU allowable temperature limit,
the ignition-ON ECU temperature corresponds to the amount of heat generated in the ECU when the ignition operation is performed a third number of times, and
the range-shift ECU temperature corresponds to the amount of heat generated in the ECU when the shift operation is performed a fourth number of times.

9. The shift range switcher according to claim 1, wherein
the ECU further includes a voltage detector configured to detect a voltage supplied to the motor from the ECU,
the ECU temperature adder adds the first temperature value to the estimated temperature of the ECU whenever an ignition switch of the vehicle is turned ON or whenever the shift range of the vehicle is switched, and
the ECU temperature adder changes the first temperature value according to the voltage detected by the voltage detector.

10. The shift range switcher according to claim 1, wherein
the ECU further includes a voltage detector configured to detect a voltage supplied to the motor from the ECU,
the motor temperature adder adds the third temperature value to the estimated temperature of the motor whenever an ignition switch of the vehicle is turned ON or whenever the shift range of the vehicle is switched, and
the motor temperature adder changes the third temperature value according to the voltage detected by the voltage detector.

11. The shift range switcher according to claim 1, wherein
the ECU further includes a motor timer configured to detect an operating time during which the motor is operated to switch the shift range,
the ECU temperature adder adds the first temperature value to the estimated temperature of the ECU whenever the shift range of the vehicle is switched, and
the ECU temperature adder changes the first temperature value according to the operating time detected by the motor timer.

12. The shift range switcher according to claim 1, wherein
the ECU further includes a motor timer configured to detect an operating time during which the motor is operated to switch the shift range,
the motor temperature adder adds the third temperature value to the estimated temperature of the motor whenever the shift range of the vehicle is switched, and
the motor temperature adder changes the third temperature value according to the operation time detected by the motor timer.

13. The shift range switcher according to claim 1, wherein
the ECU further includes a current detector configured to detect the current supplied to the motor from the ECU,
the ECU temperature adder adds the first temperature value to the estimated temperature of the ECU whenever an ignition switch of the vehicle is turned ON or whenever the shift range of the vehicle is switched, and
the ECU temperature adder changes the first temperature value according to the current detected by the current detector.

14. The shift range switcher according to claim 1, wherein
the ECU further includes a current detector configured to detect the current supplied to the motor from the ECU,
the motor temperature adder adds the third temperature value to the estimated temperature of the motor whenever an ignition switch of the vehicle is turned ON or whenever the shift range of the vehicle is switched, and
the motor temperature adder changes the third temperature value according to the current detected by the current detector.

15. The shift range switcher according to claim 1, wherein
the amount of heat generated in the motor when the motor is energized causes linear temperature increase in the motor.

16. The shift range switcher according to claim 15, wherein
the amount of heat released from the motor when the motor is de-energized causes quadratic temperature decrease in the motor.

17. The shift range switcher according to claim 1, wherein
the amount of heat generated in the ECU when the motor is energized causes quadratic temperature increase.

18. The shift range switcher according to claim 17, wherein
the amount of heat released the ECU when the motor is de-energized causes linear temperature decrease.

19. The shift range switcher according to claim 1, wherein
the amount of heat generated in the motor when the motor is energized causes linear temperature increase in the motor,
the amount of heat released from the motor when the motor is de-energized causes quadratic temperature decrease in the motor,
the amount of heat generated in the ECU when the motor is energized causes quadratic temperature increase, and
the amount of heat released the ECU when the motor is de-energized causes linear temperature decrease.

* * * * *